US012764829B2

(12) United States Patent
Lee et al.

(10) Patent No.: US 12,764,829 B2
(45) Date of Patent: Oct. 13, 2026

(54) METHOD FOR TRANSMITTING AND RECEIVING SIGNAL IN WIRELESS COMMUNICATION SYSTEM, AND DEVICE SUPPORTING SAME

(71) Applicant: LG ELECTRONICS INC., Seoul (KR)

(72) Inventors: Jeongsu Lee, Seoul (KR); Haewook Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 254 days.

(21) Appl. No.: 18/699,819

(22) PCT Filed: Nov. 3, 2022

(86) PCT No.: PCT/KR2022/017103
§ 371 (c)(1),
(2) Date: Apr. 9, 2024

(87) PCT Pub. No.: WO2023/080665
PCT Pub. Date: May 11, 2023

(65) Prior Publication Data

US 2024/0407047 A1 Dec. 5, 2024

(30) Foreign Application Priority Data

Nov. 5, 2021 (KR) ........................ 10-2021-0151782

(51) Int. Cl.
*H04L 12/00* (2006.01)
*H04W 76/28* (2018.01)

(52) U.S. Cl.
CPC .................................. *H04W 76/28* (2018.02)

(58) Field of Classification Search
CPC ....... H04W 76/28; H04W 8/24; H04W 64/00; H04W 24/10; H04W 4/02; H04W 73/23;
(Continued)

(56) References Cited

U.S. PATENT DOCUMENTS 11,778,646 B2 * 10/2023 Zhang .................. H04W 80/02
370/329
12,189,045 B2 * 1/2025 Säily .................... G01S 5/0036
(Continued)

FOREIGN PATENT DOCUMENTS

WO 2021/032280 A1 2/2021

OTHER PUBLICATIONS

LG Electronics, "Discussion on other enhancements for positioning", R1-2110093, 3GPP TSG RAN WG1 #106bis-e, Oct. 2, 2021.
(Continued)

*Primary Examiner* — Frantz Coby
(74) *Attorney, Agent, or Firm* — BRYAN CAVE LEIGHTON PAISNER LLP

(57) ABSTRACT

Various embodiments relate to a next-generation wireless communication system for supporting a data transmission rate, etc. higher than that of a $4^{th}$ generation (4G) wireless communication system. According to one embodiment, a method for transmitting and receiving signals in a wireless communication system and a device supporting same may be provided, and another embodiment may be provided.

14 Claims, 24 Drawing Sheets

(58) Field of Classification Search
CPC .......... G06N 3/044; G06N 3/045; G06N 3/08; G06N 20/00; H04L 5/0023; H04L 5/0048; H04L 76/27; H04L 5/0058; H04L 5/0091; H04L 27/261; H04L 27/2655
USPC .......................................................... 370/329
See application file for complete search history.

(56) References Cited

U.S. PATENT DOCUMENTS

| | | | | |
|---|---|---|---|---|
| 2023/0020648 A1* | 1/2023 | Cha | G01S 5/0036 | |
| 2023/0079502 A1* | 3/2023 | Cha | H04B 17/328 | 370/252 |
| 2023/0300777 A1* | 9/2023 | Cha | G01S 5/0221 | 455/456.1 |
| 2023/0300940 A1* | 9/2023 | Jang | H04W 24/10 | 370/329 |
| 2023/0300942 A1* | 9/2023 | Quan | H04W 76/30 | 370/329 |
| 2023/0328680 A1* | 10/2023 | Cha | H04W 24/10 | |
| 2024/0406923 A1* | 12/2024 | Shreevastav | H04L 5/0051 | |

OTHER PUBLICATIONS

CATT, "On where to deploy the UE location prediction function", R3-213542, 3GPP TSF RAN WG3 #113-e, Aug. 6, 2021.
ZTE et al., "Solution to AI-based mobility optimization", R3-215526, 3GPP TSG RAN WG3 #114-e, Oct. 22, 2021.
Nokia et al., "Additional views on Inactive Mode Positioning and on-deman PRS", R1-2107062, 3GPP TSG RAN WG1 #106-e, Aug. 6, 2021.

* cited by examiner (a)

(b)

METHOD FOR TRANSMITTING AND RECEIVING SIGNAL IN WIRELESS COMMUNICATION SYSTEM, AND DEVICE SUPPORTING SAME

CROSS-REFERENCE TO RELATED APPLICATIONS

This application is a National Phase application under 35 U.S.C. 371 of International Application No. PCT/KR2022/017103, filed on Nov. 3, 2022, which claims the benefit of Korean Application No. 10-2021-0151782, filed on Nov. 5, 2021, the contents of which are incorporated by reference herein in their entirety.

TECHNICAL FIELD

An embodiment is related to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

The embodiment may provide a method and apparatus for transmitting and receiving a signal in a wireless communication system.

It will be appreciated by persons skilled in the art that the objects that could be achieved with the embodiment are not limited to what has been particularly described hereinabove and the above and other objects that the embodiment could achieve will be more clearly understood from the following detailed description.

In an embodiment, provided herein are a method of transmitting and receiving signals in a wireless communication system and apparatus supporting the same.

According to the embodiment, a method performed by a user equipment (UE) in a wireless communication system may be provided.

According to the embodiment, the method may include receiving configuration information related to a reference signal for positioning.

According to the embodiment, the method may include communicating the reference signal based on the configuration information.

According to the embodiment, the method may include performing an operation related to the positioning based on the reference signal.

According to the embodiment, in receiving the configuration information, a radio resource control (RRC) state of the UE may be set to an RRC connected state.

According to the embodiment, based on that the RRC state of the UE is an RRC inactive state, the configuration information may be used.

According to the embodiment, based on that an estimated location of the UE in the RRC inactive state is obtained based on a pre-trained artificial intelligence (AI) model, (i) information related to the estimated location may be reported by the UE; and (ii) the configuration information may be generated based on the information related to the estimated location.

According to the embodiment, a plurality of weights for a plurality of model inputs for inference of the pre-trained AI model may be configured in a New Radio Positioning Protocol A (NRPPa) message.

According to the embodiment, in the inference, the plurality of model inputs having applied thereto related weights may be used.

According to the embodiment, the plurality of model inputs may include at least one of a time stamp, a velocity of the UE, an angular velocity of the UE, an acceleration of the UE, an angular acceleration of the UE, a beam direction of the UE, a time required for the UE to transmit data, or a time required for RRC state transition of the UE.

According to the embodiment, the velocity of the UE, the angular velocity of the UE, the acceleration of the UE, and the angular acceleration of the UE may be measured based on at least one sensor included in the UE.

According to the embodiment, a UE capability report related to training of the pre-trained AI model may be transmitted.

According to the embodiment, the UE capability report may include a maximum number of features for the training of the pre-trained AI model.

According to the embodiment, the information related to the estimated location may include information about the estimated location and information about an uncertainty range based on the estimated location.

According to the embodiment, the configuration information may include resource allocation information on the reference signal for a situation in which the RRC state of the UE is the RRC inactive state.

According to the embodiment, based on that the operation related to the positioning is a UE-based operation, a validation check may be performed on the resource allocation information based on the information related to the estimated location.

According to the embodiment, the validation check may be used as a criterion for determining model monitoring of the AI model.

According to the embodiment, a window may be configured based on a value for the estimated location.

According to the embodiment, the window may be configured to start with a first value obtained by subtracting an offset value from the value for the estimated location and end with a second value obtained by adding the offset value to the value for the estimated location.

According to the embodiment, based on a value for a location of the UE obtained after the estimated location is included in the window, the resource allocation information is determined to be valid during the validation check.

According to the embodiment, based on the value for the location of the UE obtained after the estimated location is not included in the window, the resource allocation information may be determined to be invalid during the validation check.

According to the embodiment, a UE configured to operate in a wireless communication system may be provided.

According to the embodiment, the UE may include: a transceiver; and at least one processor connected to the transceiver.

According to the embodiment, the at least one processor may be configured to receive configuration information related to a reference signal for positioning.

According to the embodiment, the at least one processor may be configured to communicate the reference signal based on the configuration information.

According to the embodiment, the at least one processor may be configured to perform an operation related to the positioning based on the reference signal.

According to the embodiment, in receiving the configuration information, an RRC state of the UE may be set to an RRC connected state.

According to the embodiment, based on that the RRC state of the UE is an RRC inactive state, the configuration information may be used.

According to the embodiment, based on that an estimated location of the UE in the RRC inactive state is obtained based on a pre-trained AI model, (i) information related to the estimated location may be reported by the UE; and (ii) the configuration information may be generated based on the information related to the estimated location.

According to the embodiment, the at least one processor may be configured to communicate with at least one of a mobile terminal, a network, or an autonomous vehicle other than a vehicle including the UE.

According to the embodiment, a method performed by a base station (BS) may be provided.

According to the embodiment, the method may include transmitting configuration information related to a reference signal for positioning.

According to the embodiment, the method may include communicating the reference signal based on the configuration information.

According to the embodiment, the method may include performing an operation related to the positioning based on the reference signal.

According to the embodiment, an RRC state of a UE receiving the configuration information may be set to an RRC connected state.

According to the embodiment, based on that the RRC state of the UE is an RRC inactive state, the configuration information may be used.

According to the embodiment, based on that an estimated location of the UE in the RRC inactive state is obtained based on a pre-trained AI model, (i) information related to the estimated location may be reported by the UE; and (ii) the configuration information may be generated based on the information related to the estimated location.

According to the embodiment, a BS configured to operate in a wireless communication system may be provided.

According to the embodiment, the BS may include: a transceiver; and at least one processor connected to the transceiver.

According to the embodiment, the at least one processor may be configured to transmit configuration information related to a reference signal for positioning.

According to the embodiment, the at least one processor may be configured to communicate the reference signal based on the configuration information.

According to the embodiment, the at least one processor may be configured to perform an operation related to the positioning based on the reference signal.

According to the embodiment, an RRC state of a UE receiving the configuration information may be set to an RRC connected state.

According to the embodiment, based on that the RRC state of the UE is an RRC inactive state, the configuration information may be used.

According to the embodiment, based on that an estimated location of the UE in the RRC inactive state is obtained based on a pre-trained AI model, (i) information related to the estimated location may be reported by the UE; and (ii) the configuration information may be generated based on the information related to the estimated location.

According to the embodiment, an apparatus configured to operate in a wireless communication system may be provided.

According to the embodiment, the apparatus may include: at least one processor; and at least one memory operably connected to the at least one processor and configured to store one or more instructions that, based on execution, cause the at least one processor to perform operations.

According to the embodiment, the operations may include receiving configuration information related to a reference signal for positioning.

According to the embodiment, the operations may include communicating the reference signal based on the configuration information.

According to the embodiment, the operations may include performing an operation related to the positioning based on the reference signal.

According to the embodiment, in receiving the configuration information, an RRC state of a UE may be set to an RRC connected state.

According to the embodiment, based on that the RRC state of the UE including the apparatus is an RRC inactive state, the configuration information may be used.

According to the embodiment, based on that an estimated location of the UE in the RRC inactive state is obtained based on a pre-trained AI model, (i) information related to the estimated location may be reported by the UE; and (ii) the configuration information may be generated based on the information related to the estimated location.

According to the embodiment, a non-transitory processor-readable medium configured to store one or more instructions that cause at least one processor to perform operations may be provided.

According to the embodiment, the operations may include receiving configuration information related to a reference signal for positioning.

According to the embodiment, the operations may include communicating the reference signal based on the configuration information.

According to the embodiment, the operations may include performing an operation related to the positioning based on the reference signal.

According to the embodiment, in receiving the configuration information, an RRC state of the UE may be set to an RRC connected state.

According to the embodiment, based on that the RRC state of the UE including the apparatus is an RRC inactive state, the configuration information may be used.

According to the embodiment, based on that an estimated location of the UE in the RRC inactive state is obtained based on a pre-trained AI model, (i) information related to the estimated location may be reported by the UE; and (ii) the configuration information may be generated based on the information related to the estimated location.

It will be appreciated by persons skilled in the art that the effects that can be achieved with the embodiment are not limited to what has been particularly described hereinabove and other advantages of the embodiment will be more clearly understood from the following detailed description taken in conjunction with the accompanying drawings.

According to the embodiment, a signal may be effectively transmitted and received in a wireless communication system.

According to the embodiment, positioning may be effectively performed in a wireless communication system.

According to the embodiment, the accuracy of positioning for a user equipment (UE) in a radio resource control (RRC) inactive state may be improved.

It will be appreciated by persons skilled in the art that the effects that can be achieved with the embodiment are not limited to what has been particularly described hereinabove and other advantages of the embodiment will be more clearly understood from the following detailed description taken in conjunction with the accompanying drawings.

BRIEF DESCRIPTION OF THE DRAWINGS

The accompanying drawings are provided to help understanding of the embodiment, along with a detailed description. However, the technical features of the embodiment are not limited to a specific drawing, and features disclosed in each drawing may be combined with each other to constitute a new embodiment. Reference numerals in each drawing denote structural elements.

DETAILED DESCRIPTION

The embodiment is applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

The embodiment is described in the context of a 3GPP communication system (e.g., including LTE, NR, 6G, and next-generation wireless communication systems) for clarity of description, to which the technical spirit of the embodiment is not limited. For the background art, terms, and abbreviations used in the description of the embodiment, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP SYSTEM

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
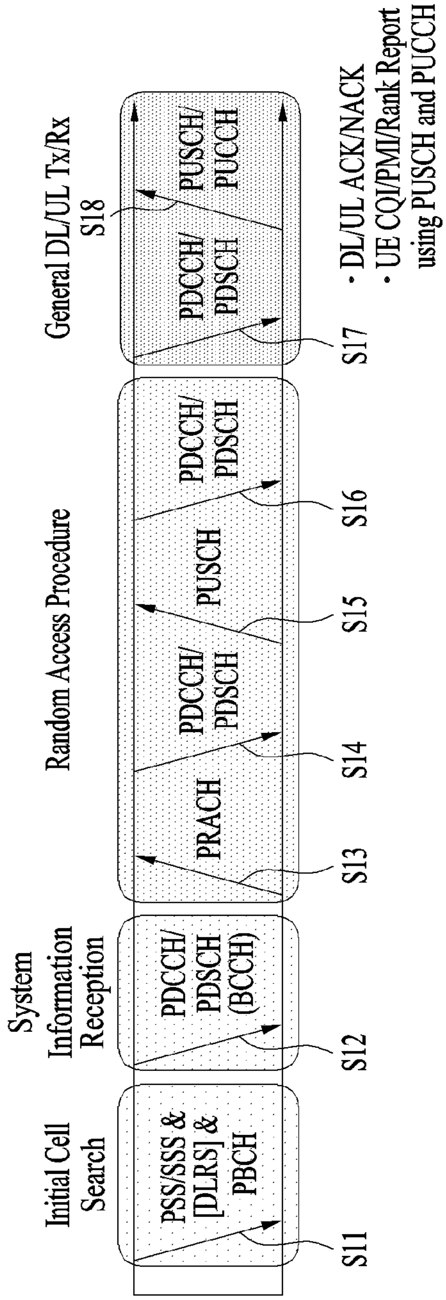
FIG. 1 is a diagram illustrating physical channels and a signal transmission method using the physical channels, which may be used in the embodiment.

FIG. 1 is a diagram illustrating physical channels and a signal transmission method using the physical channels, which may be used in the embodiment.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Figure 2:
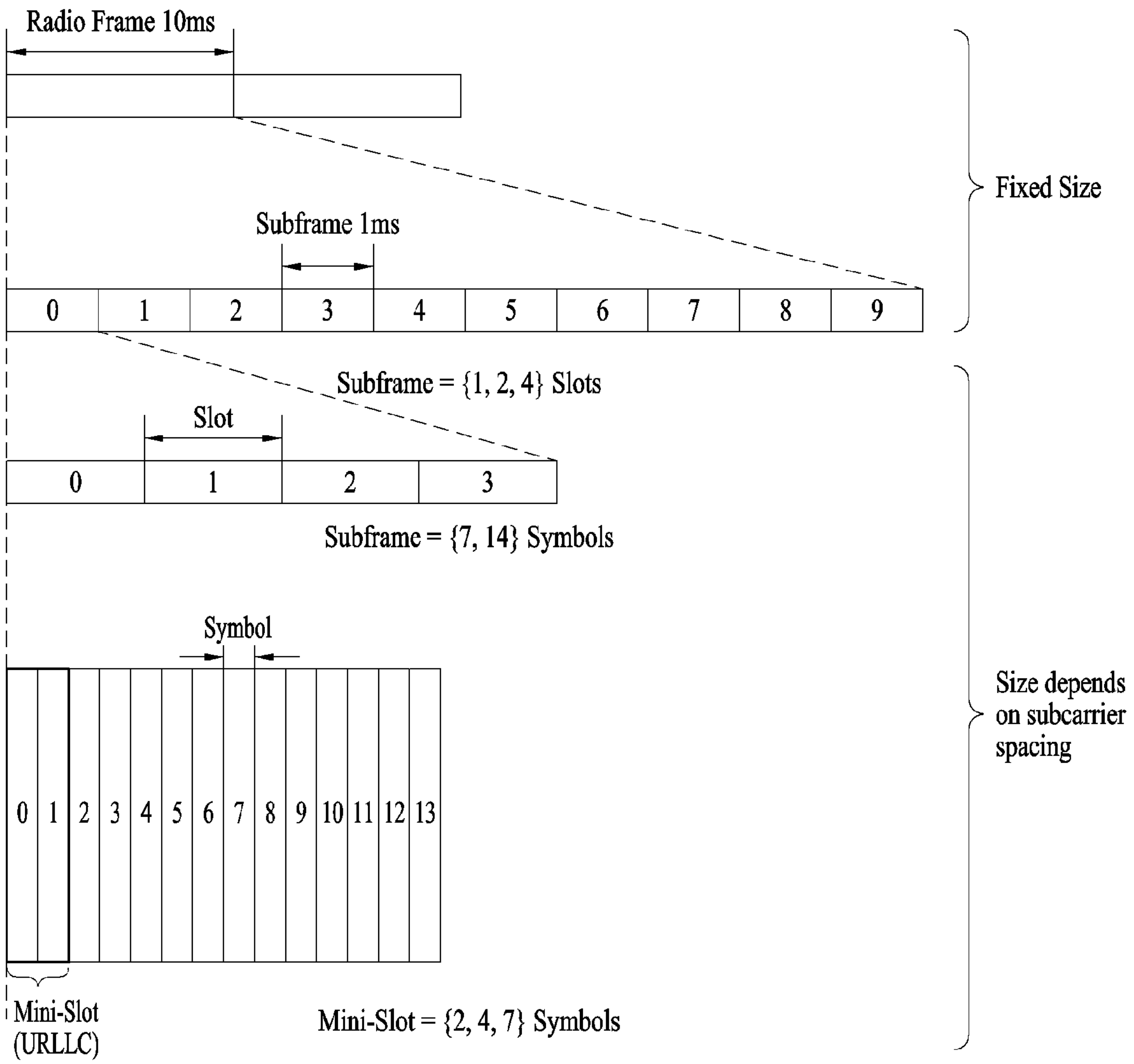
FIG. 2 is a diagram illustrating a radio frame structure in a new radio access technology (NR) system to which the embodiment is applicable.

FIG. 2 is a diagram illustrating a radio frame structure in a new radio access technology (NR) system to which the embodiment is applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, Tc=1/(Δfmax*Nf) where Δfmax=480*103 Hz and a value Nf related to a fast Fourier transform (FFT) size or an inverse fast Fourier transform (IFFT) size is given as Nf=4096. Tc and Ts which is an LTE-based time unit and sampling time, given as Ts=1/((15 kHz)*2048) are placed in the following relationship: Ts/Tc=64. DL and UL transmissions are organized into (radio) frames each having a duration of Tf=(Δfmax*Nf/100)*Tc=10 ms. Each radio frame includes 10 subframes each having a duration of Tsf=(Δfmax*Nf/1000)*Tc=1 ms. There may exist one set of frames for UL and one set of frames for DL. For a numerology μ, slots are numbered with nμs∈{0, . . . , Nslot,μsubframe−1} in an increasing order in a subframe, and with nμs,f∈{0, . . . , Nslot,μframe−1} in an increasing order in a radio frame. One slot includes Nμsymb consecutive OFDM symbols, and Nμsymb depends on a CP. The start of a slot nμs in a subframe is aligned in time with the start of an OFDM symbol nus*Nμsymb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, Nslotsymb represents the number of symbols in a slot, Nframe,μslot represents the number of slots in a frame, and Nsubframe,μslot represents the number of slots in a subframe.

In the NR system to which the embodiment is applicable, different OFDM (A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
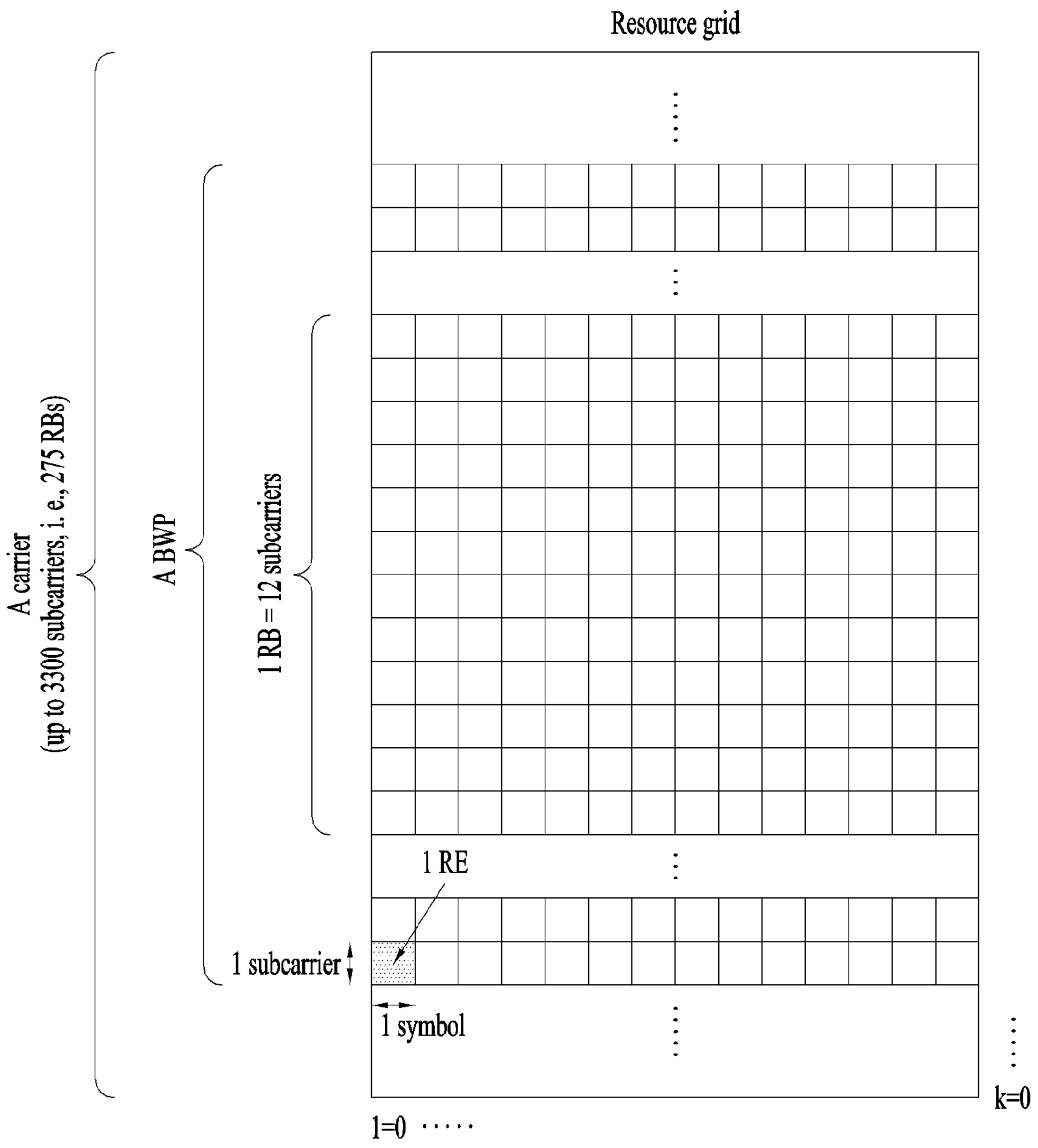
FIG. 3 illustrates an exemplary resource grid to which the embodiment is applicable.

FIG. 3 illustrates an exemplary resource grid to which the embodiment is applicable.

Referring to FIG. 3, for each subcarrier spacing (SCS) and carrier, a resource grid is defined as $14\times2^{\mu}$ OFDM symbols by $$N_{grid}^{size,\mu}\times N_{SC}^{RB}$$

subcarriers, where $$N_{grid}^{size,\mu}$$

is indicated by RRC signaling from the BS.

$$N_{grid}^{size,\mu}$$

may vary according to an SCS configuration μ and a transmission direction, UL or DL. There is one resource grid for an SCS configuration μ, an antenna port p, and a transmission direction (UL or DL). Each element of the resource grid for the SCS configuration μ and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex, value $$a_{k,l}^{(p,\mu)}.$$

An RB is defined as $$N_{SC}^{RB}=12$$

consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
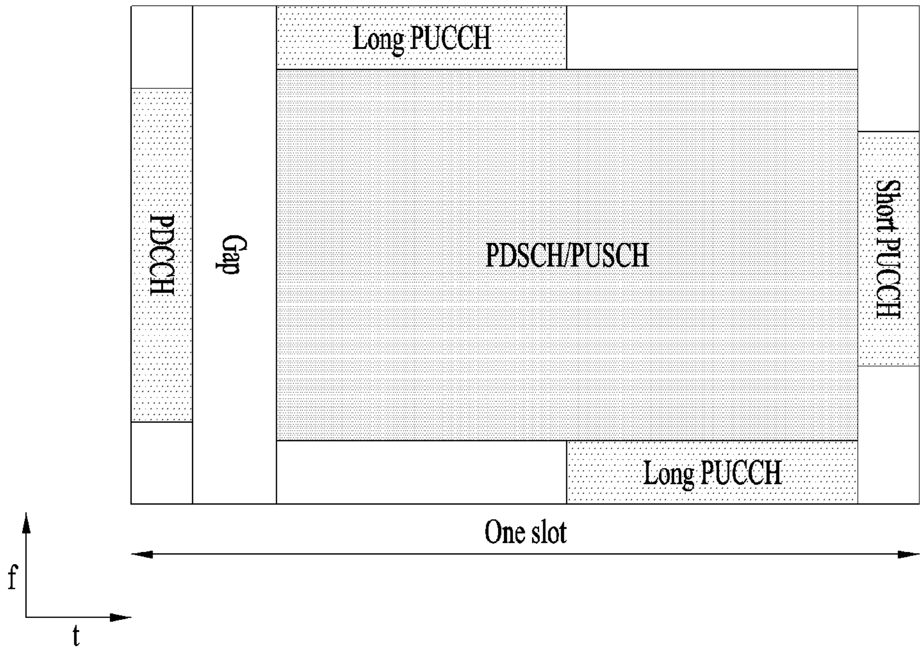
FIG. 4 is a diagram illustrating mapping of physical channels in a slot, to which the embodiment is applicable.

FIG. 4 is a diagram illustrating exemplary mapping of physical channels in a slot, to which the embodiment is applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16 QAM), 64 QAM, or 256 QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P) RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

2. POSITIONING

Positioning may refer to determination of the geographical location and/or velocity of the UE based on measurement of radio signals. Location information may be requested by a client (e.g., application) related to the UE and reported to the client. The location information may also be requested by a client existing in or connected to a core network. The location information may be reported in standard formats such as cell-based or geographical coordinates. In this case, estimated errors about the location and velocity of the UE and/or a positioning method used for positioning may be reported together.

2.1. Positioning Protocol Configuration

Figure 5:
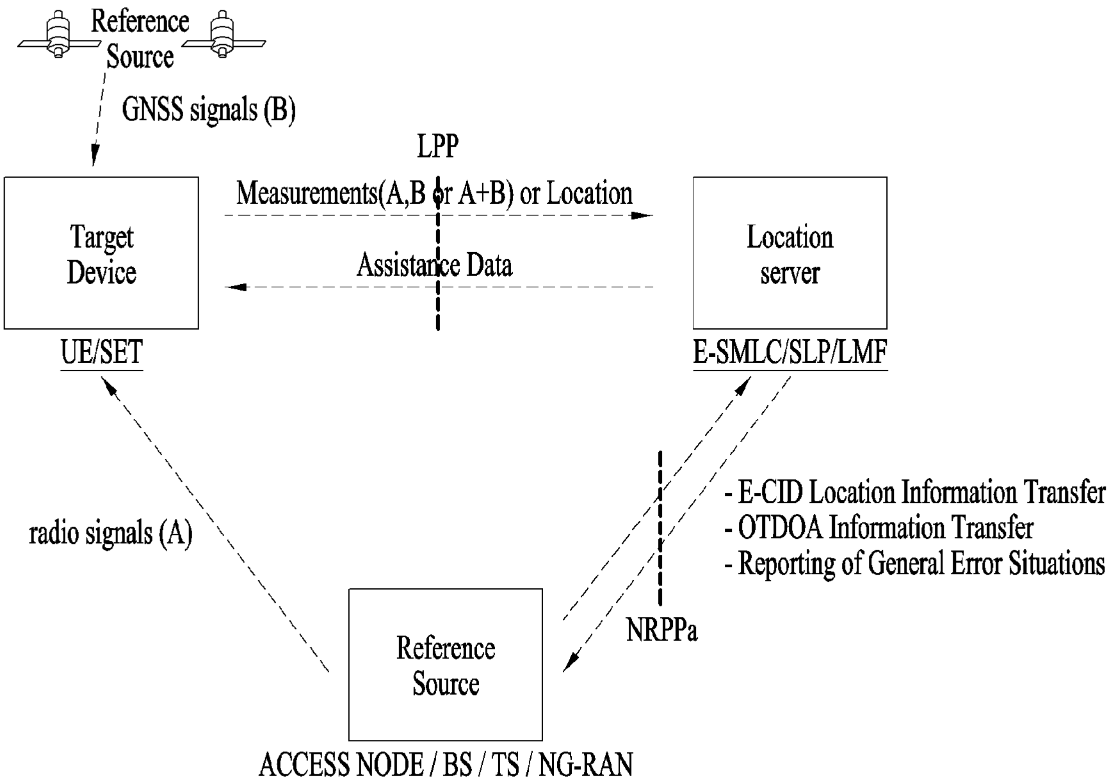
FIG. 5 is a diagram illustrating an exemplary positioning protocol configuration for user equipment (UE) positioning, which is applicable to the embodiment.

FIG. 5 is a diagram illustrating an exemplary positioning protocol configuration for positioning a UE, to which the embodiment is applicable.

Referring to FIG. 5, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

- E-CID Location Information Transfer. This function allows the reference source to exchange location information with the LMF for the purpose of E-CID positioning.
- OTDOA Information Transfer. This function allows the reference source to exchange information with the LMF for the purpose of OTDOA positioning.
- Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m)=\frac{1}{\sqrt{2}}(1-2c(m))+j\frac{1}{\sqrt{2}}(1-2c(m+1)) \quad \text{[Equation 1]}$$

c(i) may be a pseudo-random sequence. A pseudo-random sequence generator may be initialized by Equation 2.

[Equation 2]

$$c_{init} = \left(2^{22}\left\lfloor\frac{n_{ID,seq}^{PRS}}{1024}\right\rfloor + 2^{10}\left(N_{symb}^{slot}n_{s,f}^{\mu} + l + 1\right)\left(2\left(n_{ID,seq}^{PRS}\bmod 1024\right) + 1\right) + \left(n_{ID,seq}^{PRS}\bmod 1024\right)\right)\bmod 2^{31}$$

$$n_{s,f}^{\mu}$$

may be a slot number in a frame in an SCS configuration μ. A DL PRS sequence ID $$n_{ID,seq}^{PRS} \in \{0, 1, \ldots, 4095\}$$

may be given by a higher-layer parameter (e.g., DL-PRS-SequenceId). l may be an OFDM symbol in a slot to which the sequence is mapped.

Mapping to Physical Resources in a DL PRS Resource

A PRS sequence $r^{(m)}$ may be scaled by $\beta_{PRS}$ and mapped to REs $(k, l)_{p,\mu}$, specifically by Equation 3. $(k,l)_{p,\mu}$ may represent an RE (k, l) for an antenna port p and the SCS configuration μ.

[Equation 3]

$$a_{k,l}^{(p,\mu)} = \beta_{PRS}r(m)$$

$$m = 0, 1, \ldots$$

$$k = mK_{comb}^{PRS} + \left(\left(k_{offset}^{PRS} + k'\right)\bmod K_{comb}^{PRS}\right)$$

$$l = l_{start}^{PRS}, l_{start}^{PRS} + 1, \ldots, l_{start}^{PRS} + L_{PRS} - 1$$

Herein, the following conditions may have to be satisfied:

The REs $(k, l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$$l_{start}^{PRS}$$

is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $$K_{comb}^{PRS} \in \{2, 4, 6, 12\}$$

may be given by a higher-layer parameter transmission-Comb. A combination $$\{L_{PRS}, K_{comb}^{PRS}\} \text{ of } L_{PRS} \text{ and } K_{comb}^{PRS}$$

may be one of {2, 2}, {4, 2}, {6, 2}, {12, 2}, {4, 4}, {12, 4}, {6, 6}, {12, 6} and/or {12, 12}. An RE offset $$k_{offset}^{PRS} \in \{0, 1, \ldots, K_{comb}^{PRS} - 1\}$$

may be given by combOffset. A frequency offset k' may be a function of $$l - l_{start}^{PRS}$$

as shown in Table 5.

TABLE 5

| $K_{comb}^{PRS}$ | Symbol number within the downlink PRS resource $l - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

[Equation 4]

$$\left(N_{slot}^{frame,\mu}n_f + n_{s,f}^{\mu} - T_{offset}^{PRS} - T_{offset,res}^{PRS}\right)\bmod 2^{\mu}T_{per}^{PRS} \in \left\{iT_{gap}^{PRS}\right\}_{i=0}^{T_{rep}^{PRS}-1}$$

$$N_{slot}^{frame,\mu}$$

may be the number of slots per frame in the SCS configuration μ. $n_f$ may be a system frame number (SFN).

$$n_{s,f}^{\mu}$$

may be a slot number in a frame in the SCS configuration μ. A slot offset $$T_{offset}^{PRS} \in \{0, 1, \ldots, T_{per}^{PRS} - 1\}$$

may be given by a higher-layer parameter DL-PRS-ResourceSetSlotOffset. A DL PRS resource slot offset $$T_{offset,res}^{PRS}$$

may be given by a higher layer parameter DL-PRS-ResourceSlotOffset. A periodicity $$T_{per}^{PRS} \in \{4, 5, 8, 10, 16, 20, 32, 40, 64, 80, 160, 320, 640, 1280, 2560, 5120, 10240\}$$

may be given by a higher-layer parameter DL-PRS-Periodicity. A repetition factor $$T_{rep}^{PRS} \in \{1, 2, 3, 4, 6, 8, 16, 32\}$$

may be given by a higher-layer parameter DL-PRS-ResourceRepetitionFactor. A muting repetition factor $$T_{muting}^{PRS}$$

may be given by a higher-layer parameter DL-PRS-MutingBitRepetitionFactor. A time gap $$T_{gap}^{PRS} \in \{1, 2, 3, 4, 6, 8, 16, 32\}$$

may be given by a higher-layer parameter DL-PRS-ResourceTimeGap.

2.3. UE Positioning Architecture

Figure 6:
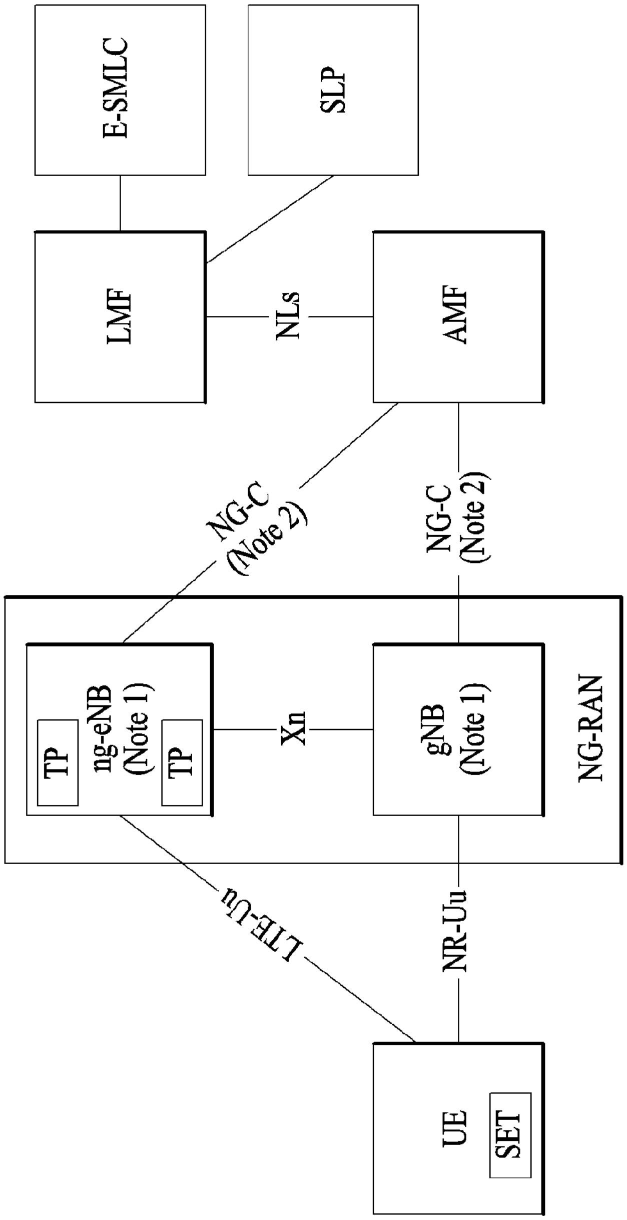
FIG. 6 is a diagram illustrating an example of an architecture of a system for positioning a UE, to which the embodiment is applicable.

FIG. 6 illustrates an exemplary system architecture for measuring positioning of a UE to which the embodiment is applicable.

Referring to FIG. 6, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QOS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 7:
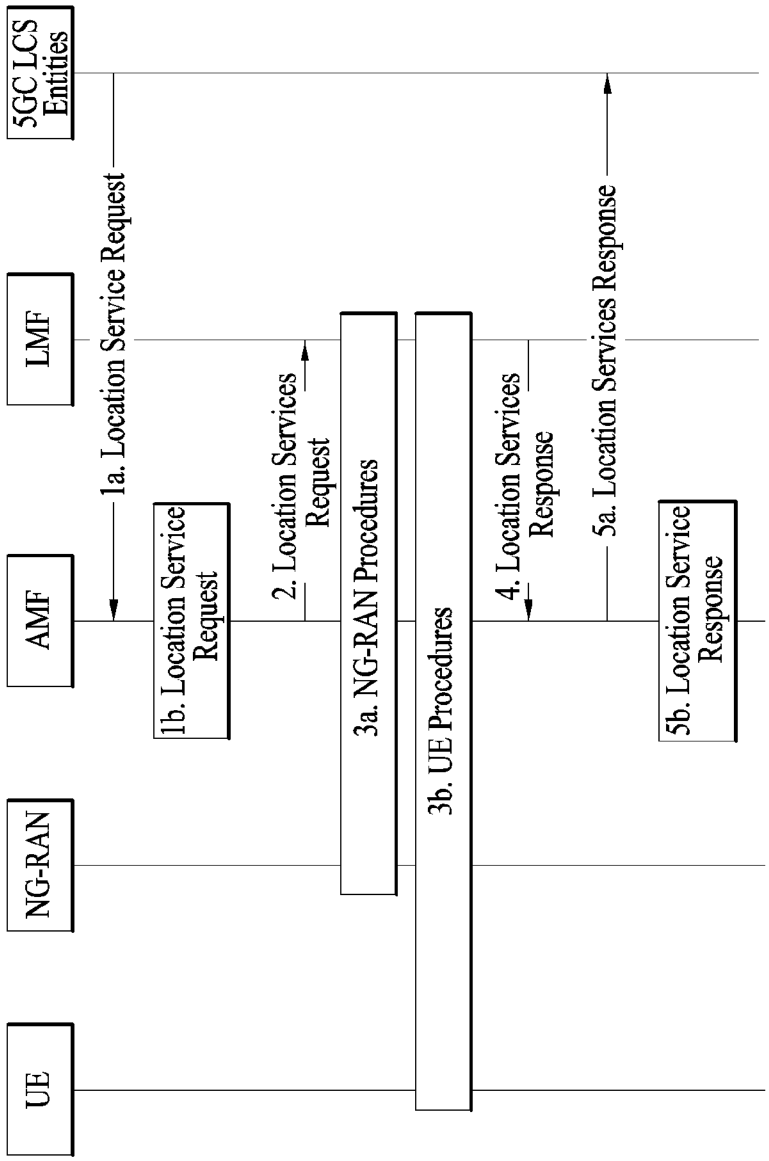
FIG. 7 is a diagram illustrating an example of a procedure of positioning a UE, to which the embodiment is applicable.

FIG. 7 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 7. In other words, in FIG. 7 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 7. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LMF or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 7 has been initiated by step 1a, the AMF may transfer the location service response to a 5GC entity such as a GMLC. If the procedure of FIG. 7 has been initiated by step 1b, the AMF may use the location service response in order to provide a location service related to an emergency call.

2.5. Positioning Protocol

LTE Positioning Protocol (LPP)

Figure 8:
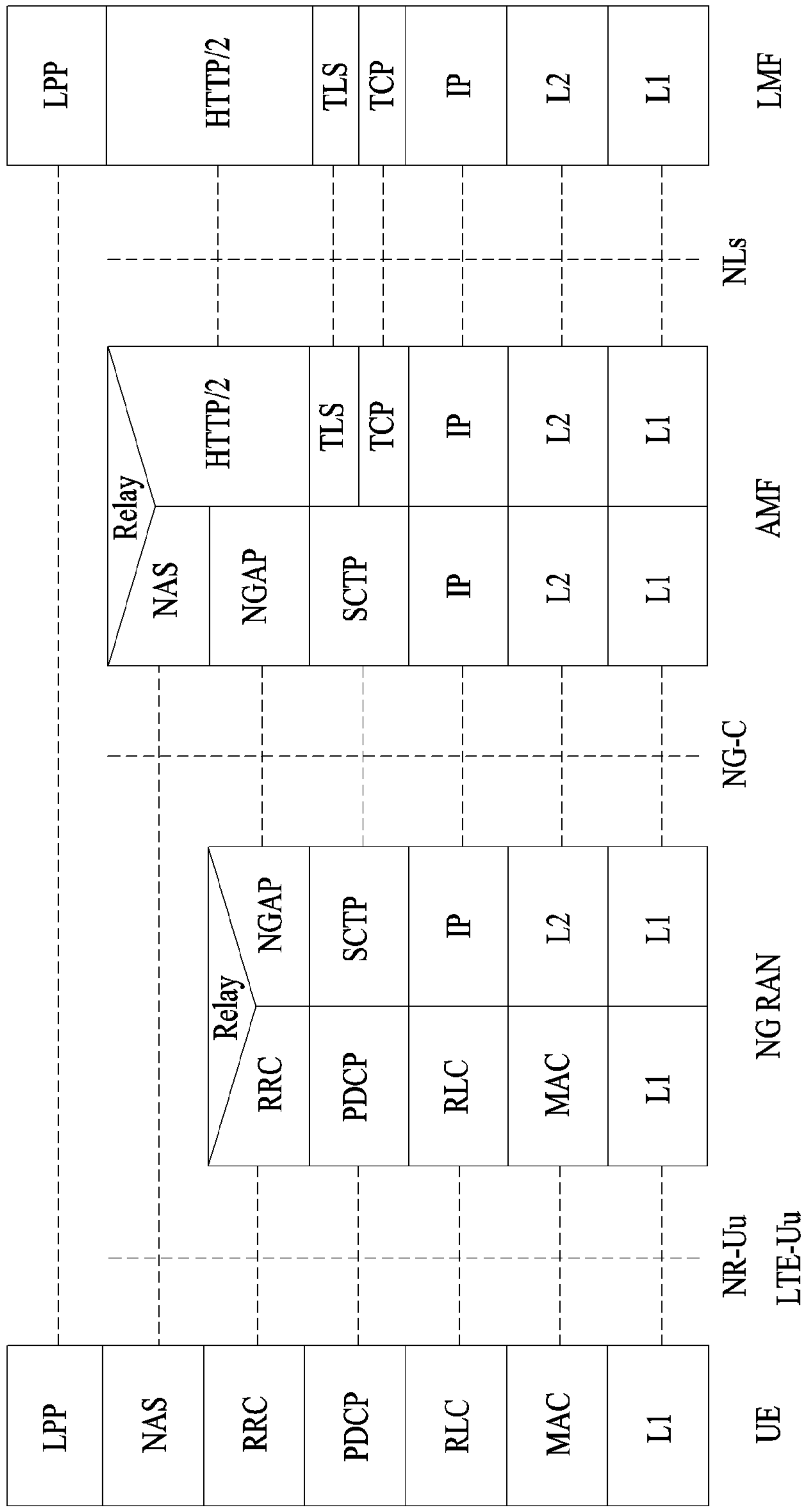
FIG. 8 is a diagram illustrating protocol layers for supporting LTE positioning protocol (LPP) message transmission, to which the embodiment is applicable.

FIG. 8 illustrates an exemplary protocol layer used to support LPP message transfer between an LMF and a UE. An LPP protocol data unit (PDU) may be carried in a NAS PDU between an AMF and the UE.

Referring to FIG. 8, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 9:
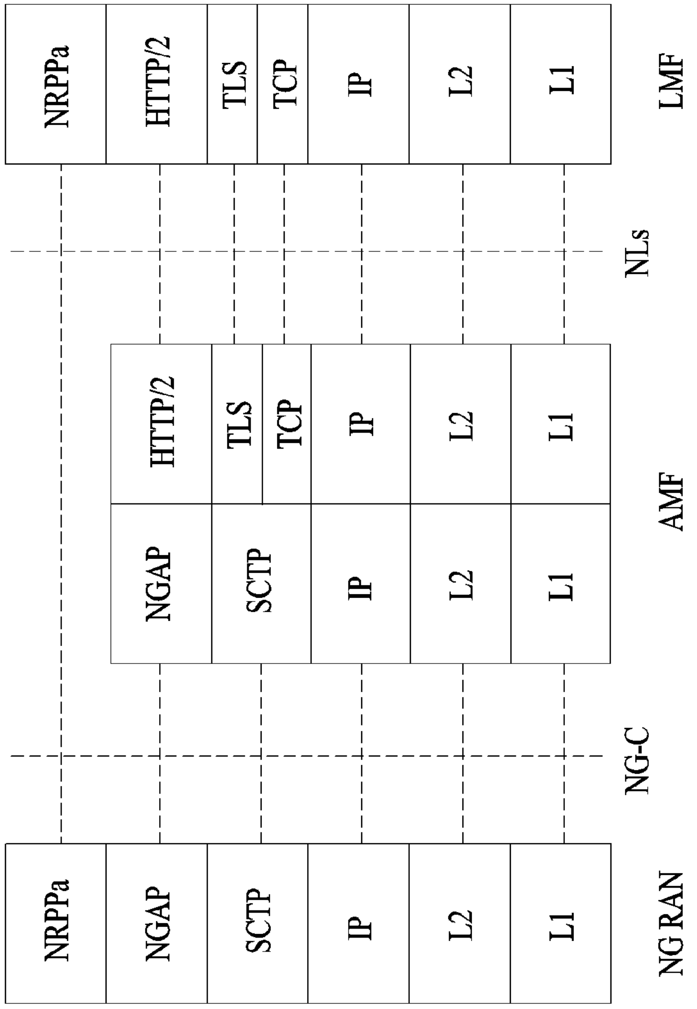
FIG. 9 is a diagram illustrating protocol layers for supporting NR positioning protocol A (NRPPa) protocol data unit (PDU) transmission, to which the embodiment is applicable.

FIG. 9 illustrates an exemplary protocol layer used to support NRPPa PDU transfer between an LMF and an NG-RAN node.

NRPPa may be used to carry information between an NG-RAN node and an LMF.

Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference of Arrival)

Figure 10:
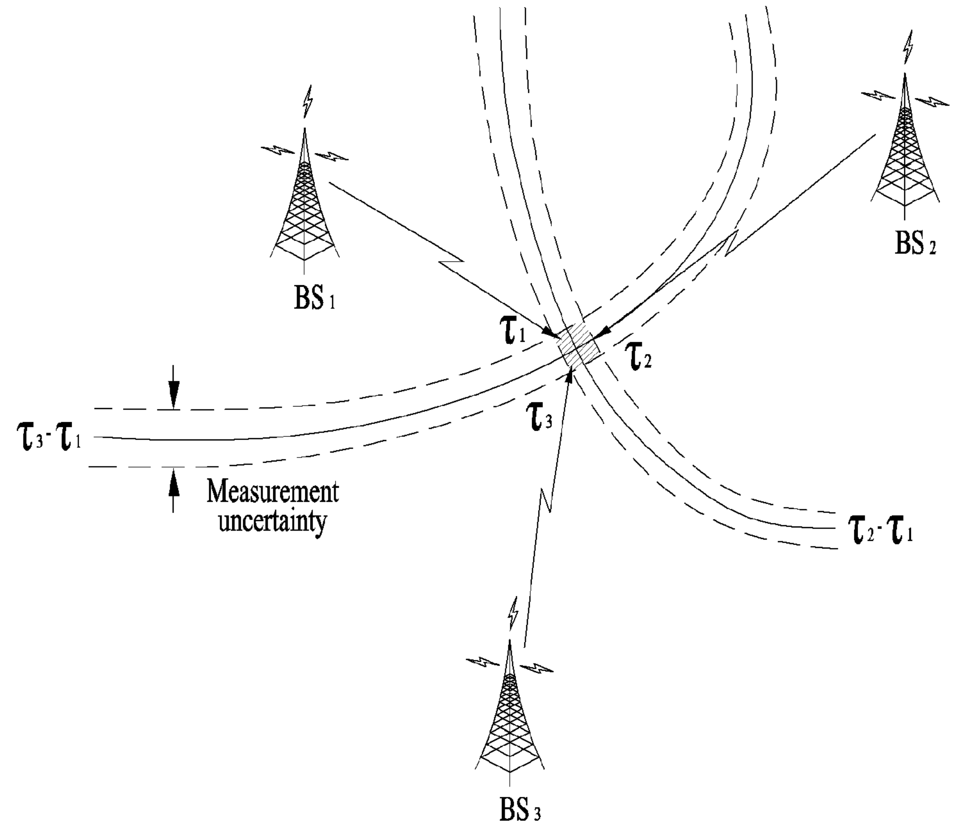
FIG. 10 is a diagram illustrating an observed time difference of arrival (OTDOA) positioning method, to which the embodiment is applicable.

FIG. 10 is a diagram illustrating an observed time difference of arrival (OTDOA) positioning method, to which the embodiment is applicable.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

[Equation 5]

$$RSTDi_{,1} = \frac{\sqrt{(x_t - x_i)^2 + (y_t - y_i)^2}}{c} -$$

-continued $$\frac{\sqrt{(x_t - x_1)^2 + (y_t - y_1)^2}}{c} + (T_i - T_1) + (n_i - n_1)$$

In Equation 5, c is the speed of light, {xt, yt} are (unknown) coordinates of a target UE, {xi, yi} are (known) coordinates of a TP, and {x1, y1} are coordinates of a reference TP (or another TP). Here, (Ti-T1) is a transmission time offset between two TPs, referred to as "real time differences" (RTDs), and ni and nl are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, TADV may be divided into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 11:
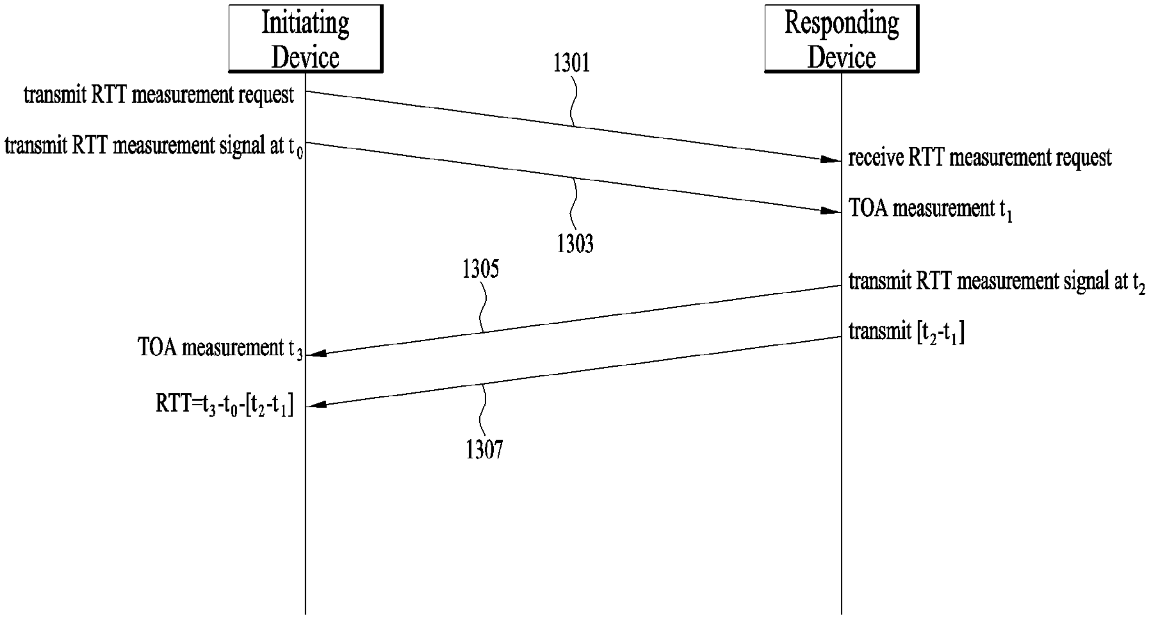
FIG. 11 is a diagram illustrating a multi-round trip time (multi-RTT) positioning method to which the embodiment is applicable.
Figure 11:
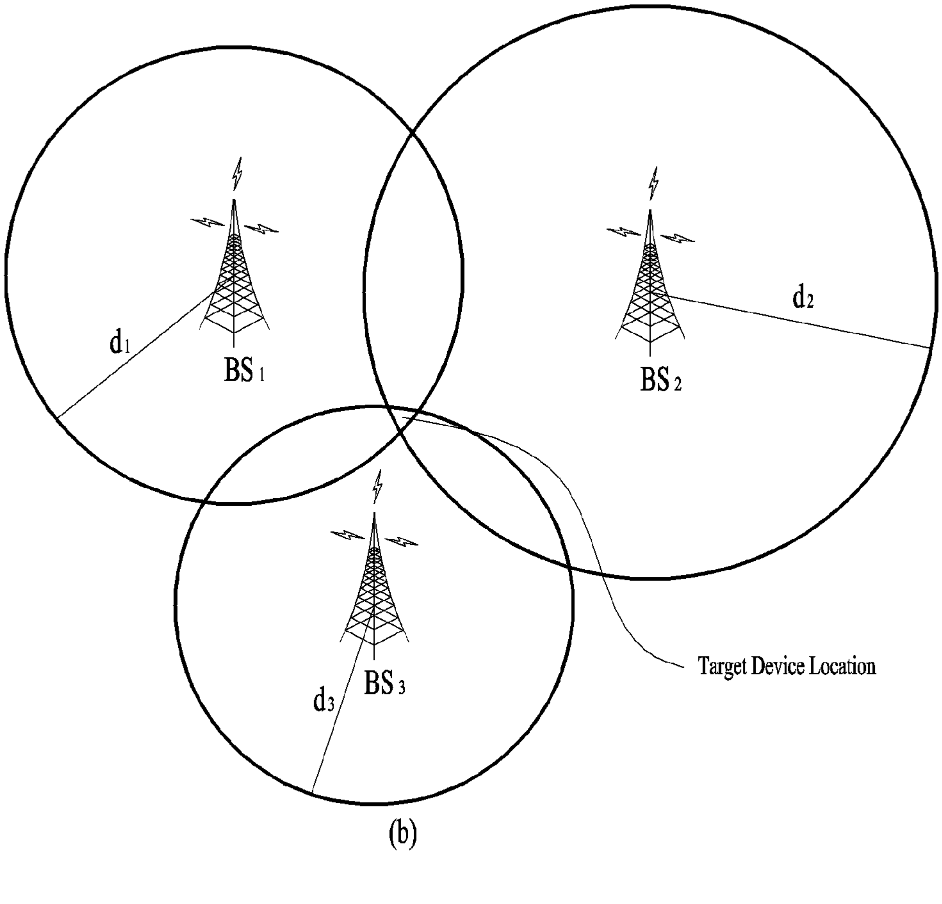

FIG. 11 is a diagram illustrating an exemplary multi-round trip time (multi-RTT) positioning method to which the embodiment is applicable.

Referring to FIG. 11(*a*), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to the embodiment, the initiating device may transmit an RTT measurement request, and the responding device may receive the RTT measurement request.

In operation 1303 according to the embodiment, the initiating device may transmit an RTT measurement signal at t0 and the responding device may acquire a ToA measurement $t_1$.

In operation 1305 according to the embodiment, the responding device may transmit an RTT measurement signal at $t_2$ and the initiating device may acquire a ToA measurement $t_3$.

In operation 1307 according to the embodiment, the responding device may transmit information about $[t_2-t_1]$, and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 11(*b*), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which the embodiment is applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 6 shows an exemplary SRS request field.

TABLE 6

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1<br>SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2<br>SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3<br>SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers |

In Table 6 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. EMBODIMENT

A detailed description will be given of the embodiment based on the above technical ideas. The afore-described contents of Section 1 and Section 2 are applicable to the embodiment described below. For example, operations, functions, terminologies, and so on which are not defined in the embodiment may be performed and described based on Section 1 and Section 2.

Symbols/abbreviations/terms used in the description of the embodiment may be defined as follows.

A/B/C: A and/or B and/or C

LMF: location management function

MAC: medium access control

MAC-CE: MAC-control element

OTDOA (OTDoA): observed time difference of arrival

PRS: positioning reference signal

RS: reference signal

RSTD: reference signal time difference/relative signal time difference

SRS: sounding reference signal. According to the embodiment, the SRS may be used for UL channel estimation and positioning measurement using multiple-input multiple-output (MIMO). In other words, according to the embodiment, the SRS may include a normal SRS and a positioning SRS. According to the embodiment, the positioning SRS may be understood as a UL RS configured for positioning of the UE and/or used for positioning of the UE. According to the embodiment, the normal SRS, which is contrasted with the positioning SRS, may be understood as a UL RS configured for UL channel estimation and/or used for UL channel estimation (and/or configured for UL channel estimation and positioning and/or used for UL channel estimation and positioning). According to the embodiment, the positioning SRS may also be called an SRS for positioning. In a description of the embodiment, terms such as the positioning SRS and the SRS for positioning may be used interchangeably and may be understood as having the same meaning. According to the embodiment, the normal SRS may also be referred to as a legacy SRS, a MIMO SRS, or an SRS for MIMO. In a description of the embodiment, terms such as normal SRS, legacy SRS, MIMO SRS, and SRS for MIMO may be used interchangeably and may be understood as having the same meaning. For example, the normal SRS and the positioning SRS may be separately configured/indicated. For example, the normal SRS and the positioning SRS may be configured/indicated by different IEs of higher layers. For example, the normal SRS may be configured based on an SRS-resource. For example, the positioning SRS may be configured based on an SRS-PosResource.

SS: synchronization signal

SSB: synchronization signal block

SS/PBCH: synchronization signal/physical broadcast channel

TDOA (TDoA): time difference of arrival

TOA (ToA): time of arrival

TRP: transmission and reception point (TP: transmission point)

In the description of the embodiment, a BS may be understood as a comprehensive term including a remote radio head (RRH), an eNB, a gNB, a TP, a reception point (RP), a relay, and the like.

In the description of the embodiment, the expression 'greater than/above A' may be replaced with the expression 'above/greater than A.'

In the description of the embodiment, the expression 'less than/below B' may be replaced with the expression 'below/less than B.'

In the description of the embodiment, an LPP/LPPa (LTE Positioning Protocol A) message may be replaced by an NRPP/NRPPa message.

In the description of the embodiment, artificial intelligence/machine learning (AI/ML) algorithms/models used by the UE/BS/LMF may be the same or different from each other.

In the description of the embodiment, the proposed embodiment may be used not only in the RRC inactive state but also equally in the idle/connected state.

In the description of the embodiment, parameters described below may also be used in meta-learning, and training sets described below may serve as task sets. In the description of the embodiment, the training set may serve as a model input and be used for inference of AI models.

In the description of the embodiment, the proposed embodiment may be equally applied not only to DL positioning measurement but also to UL positioning measurement and/or DL+UL positioning measurement.

In the description of the embodiment, the methods described in each scenario are applicable to different scenarios.

In NR systems before Rel-17, overall procedures in which the UE receives a PRS and report the analysis of the received PRS to the BS/server were supported only in the RRC connected state. However, in Rel-17, discussions are underway regarding support for positioning measurement for UEs in the RRC idle/inactive state due to various applications such as Industrial Internet of Things (IIOT) environments.

However, due to the characteristics of the inactive state, it is highly restrictive to individually transmit information on PRS resource configurations, which are typically used for positioning measurement. In addition, due to the potential mobility of the UE, the issue of practicality/effectiveness regarding whether preconfigured resources provided by information or system information received in the connected state are actually useful for positioning measurement may be raised.

In the RRC inactive state, the UE maintains the RRC connection with the BS while reducing power consumption by repeatedly performing an operation for receiving radio access network (RAN) paging for each DRX cycle. However, unlike in the connected state, the BS may broadcast information to UE groups rather than transmitting UE-specific (unicast) data to each UE. Furthermore, since the UE is capable of moving even in the inactive state, issues regarding the practicality/effectiveness of using PRS/SRS resources may arise even if information on the PRS/SRS resources is provided in the connected state or system information. Accordingly, a solution is needed to address these issues.

According to the embodiment, positioning measurement based on AI/ML may be provided to handle unexpected situations such as the kidnapped-robot problem in the inactive state and ensure smooth UE positioning.

Figure 12:
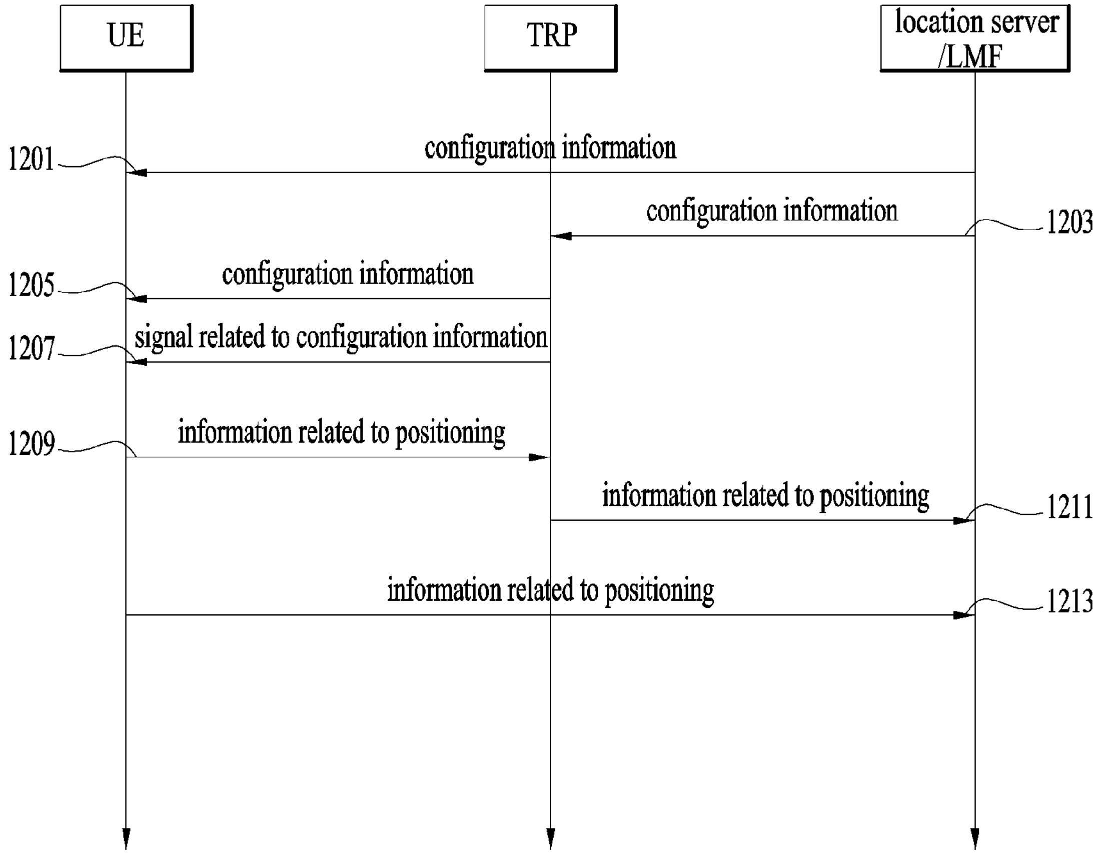
FIG. 12 is a simplified diagram illustrating a method of operating a UE, a transmission and reception point (TRP), a location server, and/or a location management function (LMF) according to the embodiment.

FIG. 12 is a simplified diagram illustrating an operating method of a UE, a TRP, a location server, and/or an LMF according to the embodiment.

Referring to FIG. 12, in operation 1201 according to the embodiment, the location server and/or the LMF may transmit configuration indicated to the UE and the UE may receive the configuration information.

In operation 1203 according to the embodiment, the location server and/or the LMF may transmit reference configuration information to the TRP and the TRP may receive the reference configuration information. In operation 1205 according to the embodiment, the TRP may transmit the reference configuration information to the UE and the UE may receive the reference configuration information. In this case, operation 1201 according to the embodiment may be omitted.

In contrast, operations 1203 and 1205 according to the embodiment may be omitted. In this case, operation 1201 according to the embodiment may be performed.

That is, operation 1201 according to the embodiment, and operations 1203 and 1205 according to the embodiment may be selectively performed.

In operation 1207 according to the embodiment, the TRP may transmit a signal related to the configuration information and the UE may receive the signal related to the configuration information. For example, the signal related to the configuration information may be a signal for positioning of the UE.

In operation 1209 according to the embodiment, the UE may transmit a signal related to positioning to the TRP and the TRP may receive the signal related to positioning. In operation 1211 according to the embodiment, the TRP may transmit the signal related to positioning to the location server and/or the LMF and the location server and/or the LMF may receive the signal related to positioning.

In operation 1213 according to the embodiment, the UE may transmit the signal related to positioning to the location server and/or the LMF and the location server and/or the LMF may receive the signal related to positioning. In this case, operations 1209 and 1211 according to the embodiment may be omitted.

In contrast, operation 1213 according to the embodiment may be omitted. In this case, operations 1209 and 1211 according to the embodiment may be performed.

That is, operations 1209 and 1211 according to the embodiment, and operation 1213 according to the embodiment may be selectively performed.

According to the embodiment, the signal related to positioning may be obtained based on the configuration information and/or the signal related to the configuration information.

Figure 13:
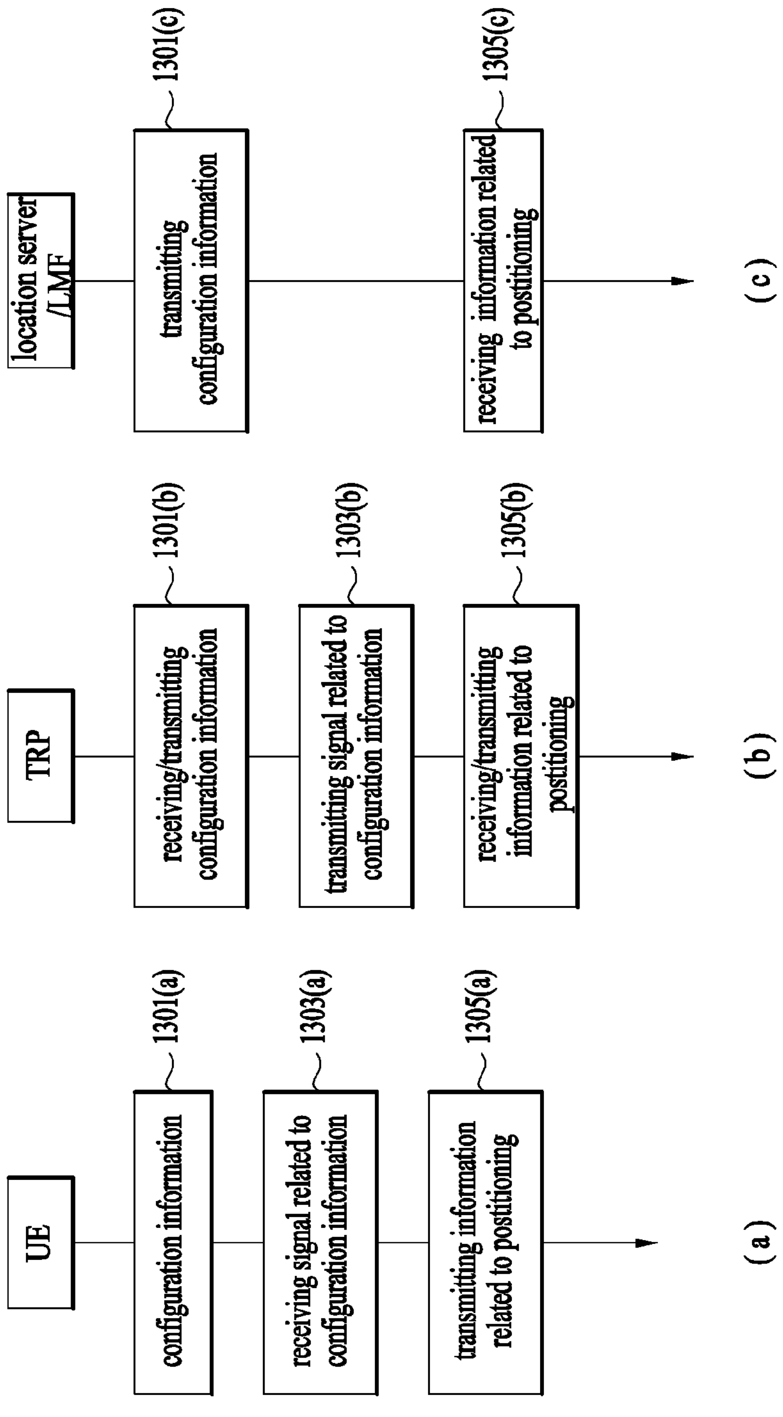
FIG. 13 is a simplified diagram illustrating a method of operating a UE, a transmission and reception point (TRP), a location server, and/or a location management function (LMF) according to the embodiment.

FIG. 13 is a simplified diagram illustrating an operating method of a UE, a TRP, a location server, and/or an LMF according to the embodiment.

Referring to FIG. 13(*a*), in operation 1301(*a*) according to the embodiment, the UE may receive configuration information.

In operation 1303(*a*) according to the embodiment, the UE may receive a signal related to the configuration information.

In operation 1305(*a*) according to the embodiment, the UE may transmit information related to positioning.

Referring to FIG. 13(*b*), in operation 1301(*b*) according to the embodiment, the TRP may receive configuration information from the location server and/or the LMF and transmit the configuration information to the UE.

In operation 1303(*b*) according to the embodiment, the TRP may transmit a signal related to the configuration information.

In operation 1305(*b*) according to the embodiment, the TRP may receive information related to positioning and transmit the information related to positioning to the location server and/or the LMF.

Referring to FIG. 13(*c*), in operation 1301(*c*) according to the embodiment, the location server and/or the LMF may transmit configuration information.

In operation 1305(*c*) according to the embodiment, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of the embodiment below.

For example, the above signal related to positioning may be understood as a signal related to one or more pieces of information that the UE reports and/or a signal including one or more pieces of information that the UE reports, in a description of the embodiment below.

For example, in a description of the embodiment below, the BS, the gNB, and the cell may be replaced with the TRP, the TP, or any device serving equally as the TRP or the TP.

For example, in a description of the embodiment below, the location server may be replaced with the LMF and any device serving equally as the LMF.

More detailed operations, functions, terms, etc. in operation methods according to the embodiment may be performed and described based on the embodiment described later. The operation methods according to the embodiment is exemplary and one or more operations in the above-described operation methods may be omitted according to detailed content of each embodiment.

Hereinafter, the embodiment will be described in detail. It may be understood by those of ordinary skill in the art that the embodiment described below may be combined in whole or in part to implement other embodiments unless mutually exclusive.

Generally, when the UE performs DL positioning measurement, information on relevant PRS resources is provided from the LMF. Information on SRS resources required for UL positioning measurement is determined by the gNB, and the LMF transmits information on SRS resources confirmed by each BS to the UE via the LPP. Due to the characteristics of the RRC inactive state, resources such as channels and signals are significantly limited to transmit data to specific UEs.

According to the embodiment, methods for performing more accurate positioning measurement in the inactive state based on the use of AI/ML are provided.

According to the embodiment, positioning may be classified into UE-based positioning where the UE directly calculates the location of the UE and UE-assisted positioning where the UE transmits measurement results for the angle, power, and timing of a received signal to the LMF. Procedures and methods may be provided for each of these approaches.

Scenario 1: UE-Based

In Scenario 1, since the UE directly calculates the location thereof, the UE may know the location thereof.

According to the embodiment, to use an AI/ML algorithm/model, the UE may buffer not only its own location but also information on the current speed and/or velocity (including the angle, i.e., angular speed/velocity), the acceleration (including the angle, i.e., angular acceleration), and/or the beam direction of the UE (based on the global coordination system (GCS) and/or local coordination system (LCS)), using gyroscopes and accelerometers at each time history/stamp (t−1, t−2, . . . ). The UE may use the related information as the feature of a specific AI/ML algorithm/model.

Additionally/alternatively, according to the embodiment, information on the pattern of time required for the UE to transmit its own data (e.g., duration, repetition, and/or periodicity) may also serve as the feature of a training set. According to the embodiment, each measured value may be used as a training set. According to the embodiment, the output of the UE may be the expected time for RRC state transition, the location, or any specific feature. According to the embodiment, based on the obtained output, the UE may directly request/transmit updates of information on PRS resources to the LMF via NRPP messages. Alternatively, the UE may transmit the request to the BS via RRC or MAC-CE, and the BS may forward the request for the updates to the LMF.

According to the embodiment, the Request/Provide message for the updates may contain information on training sets or outputs.

For example, if the UE transmits the request at time t, the UE may transmit one or multiple outputs (expected values) for a specific time, time t+m. Alternatively, the UE may group the outputs (expected values) over time (e.g., t+N1, t+N2, t+N3, . . . , t+m) within a predictable period of time and then transmit the grouped outputs. In this case, N1, N2, and N3 may represent time points with regular steps or irregular intervals. Additionally/alternatively, each output may include the location or transition state of the UE, and each output may serve as each feature of a training data set.

According to the embodiment, when the UE reports its capability, the UE may transmit a predictable time, the maximum number of features, supported features, and/or a predictable time range (t) to the LMF.

According to the embodiment, when the UE performs prediction/reporting, the UE may directly transmit the predicted location as the output to the LMF or BS based on the GCS or LCS. Additionally/alternatively, according to the embodiment, the UE may additionally report an uncertainty range starting from the corresponding point. The corresponding uncertainty range may be expressed as the value of a radius r in 2D/3D. The LMF or BS may transmit to the UE the PRS resources of TRPs within the range encompassed by the uncertainty range, based on the predicted location as the center of the circle/sphere.

According to the embodiment, the BS and/or LMF may directly transmit to the UE the weights for each feature used for the output via NRPP messages. The UE then applies the received weights to each feature and generates the output through the AI/ML algorithm/model.

According to the embodiment, when transmitting information on the output, the UE may also transmit the degree of reliability to the LMF or BS. According to the embodiment, the degree of reliability may be mapped from 0 (uncertain) to 1 (certain). According to the embodiment, the degree of reliability may be associated with each reported output and transmitted in the same quantity. The reliability level can be referenced from a predefined table or reported with a specific granularity of 0.1 steps.

According to the embodiment, if the UE has information on the location of each TRP, the UE may directly send a request for one or multiple TRPs among the TRPs with the closest 3D distance to the point at each time point based on the predicted location at each time point to report, unlike UE-assisted positioning According to the embodiment, based on the request from the UE, the LMF may transmit associated PRS resources to the UE before the UE transitions to the inactive state. According to the embodiment, the TRPs associated with the PRS resources are mapped and provided in time units reported by the UE. Alternatively, additional information such as the antennas and locations of TRPs on the LMF side may be used to include PRS and/or SRS resources for recommended TRPs, in addition to the requested TRPs. According to the embodiment, in the case of UE-based positioning, since the UE is capable of directly calculating its own location, the UE may prioritize the PRS resources associated with the TRPs requested by the UE over the PRS resources for recommended TRPs in the inactive state.

Scenario 2: UE-Assisted

In Scenario 2, the UE receives a PRS and transmits the measured timing/angle/power results to the LMF, instead of directly calculating its own location.

According to the embodiment, in Scenario 2, the LMF may stack information on the mobility history of the UE, featureize the information, and derive an output regarding the prediction of state transition in the inactive state through an AI/ML algorithm/model. According to the embodiment, based on these results, the LMF may transmit NRPP messages (e.g., requestlocationinformation) to the UE.

According to the embodiment, the existing NRPP message may be used (a new IE in the existing NRPP message may be used). However, for a positioning request associated with AUML, since a large amount of information is required, a separate NRPP message (e.g., requestUpdatelocationinformation) may be separately defined and transmitted.

According to the embodiment, the information transmitted from the LMF to the UE may basically include information on PRS resource(s) and set(s) associated with TRPs to be used in the inactive state, other than information for triggering positioning measurement.

According to the embodiment, the separate NRPP message (e.g., requestUpdatelocationinformation) may also include the configuration for a window in which the UE measures the PRS. According to the embodiment, the separate NRPP message (e.g., reqeustUpdatelocationinformation) may also include information on the priorities of other channels (e.g., SSB, SIB1, CORESET0, MSG2/MSGB, paging, DL small data transmission (SDT)).

According to the embodiment, the priority may be provided by fixing the order of the channels and assigning rankings in the order. Additionally/alternatively, the priority may be provided by indexing each channel and associating the index with the priority order in descending or ascending order. According to the embodiment, the priority may be applied within the window allowed for PRS measurement.

According to the embodiment, the expected time for transition to the inactive state, which is calculated by the LMF, may also be included. According to the embodiment, if the UE does not enter the inactive state until the expected time, the UE may disregard the information indicated in the NRPP message (e.g., requestUpdatelocationinformation) and continue to follow legacy information.

Additional Assistance Data

According to the embodiment, before entering the inactive state, the UE in the connected state may request updates for associated PRS or SRS resources from the LMF or BS. However, since the request is made without considering the delay associated with message generation and transmission by the BS and LMF, the LMF and/or BS may inform the UE of the minimum required time for a response to the updates via unicast or broadcast. According to the embodiment, if the minimum required (necessary) time is not satisfied, the UE may not execute the method.

Additionally/alternatively, according to the embodiment, the LMF and/or BS may provide to the UE the maximum marginal time for the request transmission. According to the embodiment, the UE may transmit the request only when the state transition to the inactive state occurs after the above time, thereby ensuring the reception of the measurement request by the LMF or BS.

Validation Check in UE Side

According to the embodiment, in the inactive state, the UE may attempt to wake up at each paging DRX cycle to receive paging on its paging occasion (PO). According to the embodiment, if there are indications from the LMF or BS, the UE may perform PRS reception. However, according to the embodiment, indicated PRS resources may result in performance degradation in terms of accuracy due to the mobility of the UE during deep/slight sleep. According to the embodiment, even if the UE initially receives information on updated relevant PRS resources, the PRS resources may not be valid. According to the embodiment, if the UE supports UE-based positioning, the UE knows the previously reported location. Thus, the UE may provide feedback on resource reconfiguration or unavailability through validation checks. According to the embodiment, the validation check may serve as a metric for monitoring AI models, which are related to the life cycle management of AI models.

If the UE supports the methods described in Scenarios 1 and 2 described above, the UE may receive expected paging and, at the same time, approximately measure the location at the corresponding time point based on non-standard methods (e.g., GNSS) or standard methods (e.g., SSB). The UE may compare the corresponding information with information reported in the connected state and, based on the results, the UE may provide the BS or LMF with the PRS resource reconfiguration or unavailability.

According to the embodiment, the LMF and/or BS may configure and indicate to the UE a window (±offset) for element(s) of the Update Request and/or Provide Update information in Scenarios #1 and #2, thereby enabling the UE to compare the corresponding information with the previously reported measurement results. For example, if the UE transmits information on the predicted location to the LMF and/or BS, the window (±offset) for the corresponding value may be provided through assistance data. According to the embodiment, if the measured and calculated value exceeds the window, the UE may transmit to the LMF or BS indication information indicating that the previous PRS resource configuration is invalid. According to the embodiment, if transmission is allowed via RRC, MAC-CE, or/and UCI, if there are sufficient available UL signal or channel resources, or if the amount of transmitted information is small as in SDT, the UE may transmit the currently measured information to the BS and LMF, and BS and LMF may reconfigure the TRP and PRS resource(s)/set(s) related to the measurement results. According to the embodiment, the reconfiguration may be transmitted in msg2 or msg4 of the paging or RACH procedure.

Hereinafter, AI and/or ML applicable to the embodiment will be described.

Artificial Intelligence (AI)

If AI is introduced to communication, real-time data transmission may be simplified and enhanced. AI may determine a method of performing complex target tasks based on numerous analyses. In other words, AI may increase efficiency and reduce processing delays.

Time-consuming tasks such as handover, network selection, and resource scheduling may be performed instantly with the use of AI. AI may also play a crucial role in machine-to-machine (M2M), machine-to-human, and human-to-machine communication. In addition, AI may enable rapid communication in a brain-computer interface (BCI). AI-based communication systems may be supported by metamaterials, intelligent architectures, intelligent networks, intelligent devices, intelligent recognition radios, self-sustaining wireless networks, and MI.

Recently, there have been attempts to integrate AI into wireless communication systems with a focus on the application layer and network layer. Particularly, deep learning has been focused on the wireless resource management and allocation field. However, these studies are gradually developed towards the MAC layer and physical layer, and attempts to combine deep learning at the physical layer with wireless transmission are emerging. AI-based physical layer transmission means applying signal processing and communication mechanisms based on AI drivers rather than traditional communication frameworks in fundamental signal processing and communication mechanisms. For example, channel coding and decoding based on deep learning, signal estimation and detection based on deep learning, MIMO mechanisms based on deep learning, resource scheduling and allocation based on AI, and so on may be included.

ML may be used for channel estimation and tracking as well as power allocation, interference cancellation, etc. at the physical layer of DL. In addition, ML may be used for antenna selection, power control, symbol detection, etc. in the MIMO system.

However, the application of a deep neural network (DNN) for transmission at the physical layer may encounter the following challenges.

AI algorithms based on deep learning require a large amount of training data to optimize training parameters. However, due to limitations in acquiring data from specific channel environments, a significant amount of training data is often used offline. Static training of training data in specific channel environments may lead to contradictions between the dynamic features and diversity of wireless channels.

Furthermore, current deep learning primarily targets real signals. However, signals at the physical layer of wireless communication are complex signals. More research is needed on neural networks for detecting complex-domain signals to match the characteristics of wireless communication signals.

Hereinafter, ML will be described in detail.

ML refers to a series of operations for training machines to perform tasks that are difficult to be performed by human. ML requires data and learning models. In ML, data learning methods may be broadly categorized into three types: supervised learning, unsupervised learning, and reinforcement learning.

Neural network learning is aimed at minimizing errors in the output. Neural network learning refers to a process of repeatedly inputting training data to a neural network, calculating the error of the output and target of the neural network for the training data, backpropagating the error of the neural network from the output layer of the neural network to the input layer to reduce the error, and updating the weight of each node of the neural network.

Supervised learning may use training data labeled with a correct answer, whereas unsupervised learning may use training data that is not labeled with a correct answer. That is, for example, in the case of supervised learning for data classification, training data may be labeled with each category. The labeled training data may be input to the neural network, and the output (category) of the neural network may be compared with the label of the training data, thereby calculating the error. The calculated error may be backpropagated from the neural network backward (that is, from the output layer to the input layer), and the connection weight of each node of each layer of the neural network may be updated based on the backpropagation. Changes in the updated connection weight of each node may be determined based on the learning rate. The calculation of the neural network for input data and the backpropagation of the error may configure a learning cycle (epoch). The learning data may be applied differently depending on the number of repetitions of the learning cycle of the neural network. For example, in the early phase of learning of the neural network, a high learning rate may be used to increase efficiency such that the neural network rapidly ensures a certain level of performance, but in the late phase of learning, a low learning rate may be used to increase accuracy.

The learning method may vary according to the feature of data. For example, to allow a receiver to accurately predict data transmitted from a transmitter in a communication system, learning may be performed based on supervised learning rather than unsupervised learning or reinforcement learning.

The learning model corresponds to the human brain and may be regarded as the most basic linear model. However, the paradigm of machine learning that uses a highly complex neural network structure such as artificial neural networks as a learning model is referred to as deep learning.

Neural network cores used for learning may be broadly categorized into a deep neural network (DNN), a convolutional deep neural network (CNN), and a recurrent neural machine (RNN).

The artificial neural network is an example of interconnected perceptrons.

Figure 14:
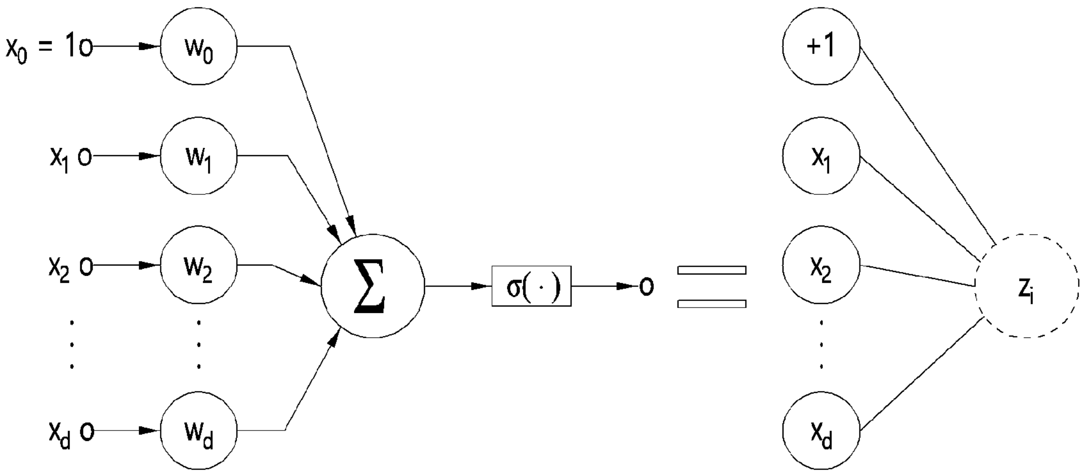
FIG. 14 illustrates an exemplary perceptron structure to which the embodiment is applicable.

FIG. 14 illustrates an exemplary perceptron structure to which the embodiment is applicable.

Figure 15:
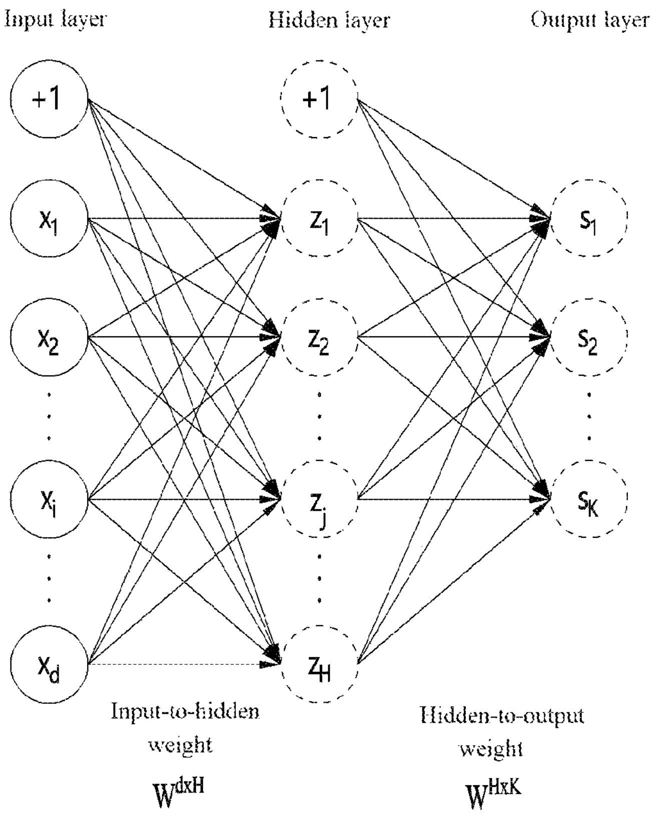
FIG. 15 illustrates an exemplary multi-layer perceptron structure to which the embodiment is applicable.

FIG. 15 illustrates an exemplary multi-layer perceptron structure to which the embodiment is applicable.

Referring to FIG. 14, a process of receiving an input vector of x=(x1, x2, . . . , xd), multiplying each component by weights (W1, W2, . . . , Wd), summing up the results, and then applying an activation function of $\sigma(\cdot)$ is referred to as a perceptron. For a large artificial neural network structure, the simplified perceptron structure shown in FIG. 14 may be extended. That is, an input vector may be applied to different perceptrons of multiple dimensions. For convenience of description, nodes refer to input or output values.

The perceptron structure shown in FIG. 14 may be described as consisting of a total of three layers based on input and output values. An artificial neural network having H perceptrons of (d+1) dimensions between the first and second layers and having K perceptrons of (H+1) dimensions between the second and third layers may be represented as shown in FIG. 15.

A layer where input vectors are located is called an input layer, a layer where final output values are located is called an output layer, and all layers between the input and output layers are referred to as hidden layers. In the example of FIG. 15, three layers are illustrated. However, when the actual number of layers in an artificial neural network is counted excluding the input layer, there are a total of two layers. An artificial neural network is constructed by two-dimensionally connecting perceptrons of basic blocks.

The input layer, hidden layer, and output layer are commonly applied not only to multi-layer perceptrons but also to various other artificial neural network structures such as the CNN, RNN, and so on, which will be described later. As the number of hidden layers increases, the artificial neural network becomes deeper, and the machine learning paradigm that uses a sufficiently deep artificial neural network as the learning model is called deep learning. In addition, the artificial neural network used for deep learning is referred to as the DNN.

In addition to the DNN, CNN, and RNN, the neural network cores used for learning include various deep learning techniques such as a Restricted Boltzmann machine (RBM), a deep belief network (DBN), and a deep Q-network. These techniques may be applied in the following fields: computer vision, speech recognition, natural language processing, and audio/signal processing.

Recently, there have been efforts to integrate AI into wireless communication systems with a focus on the application layer and network layer. Particularly, deep learning has been focused on the wireless resource management and allocation field. However, these studies are gradually developed towards the MAC layer and physical layer, and attempts to combine deep learning at the physical layer with wireless transmission are emerging. AI-based physical layer transmission means applying signal processing and communication mechanisms based on AI drivers rather than traditional communication frameworks in fundamental signal processing and communication mechanisms. For example, channel coding and decoding based on deep learning, signal estimation and detection based on deep learning, MIMO mechanisms based on deep learning, resource scheduling and allocation based on AI, and so on may be included.

Figure 16:
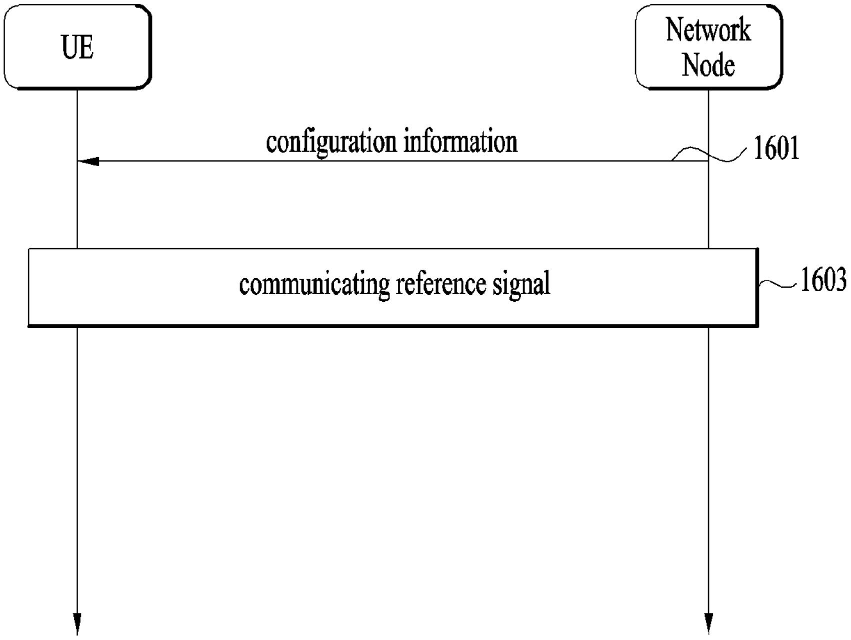
FIG. 16 is a diagram schematically illustrating an operation method of a UE and a network node according to the embodiment.

FIG. 16 is a diagram schematically illustrating an operation method of a UE and a network node according to the embodiment.

Figure 17:
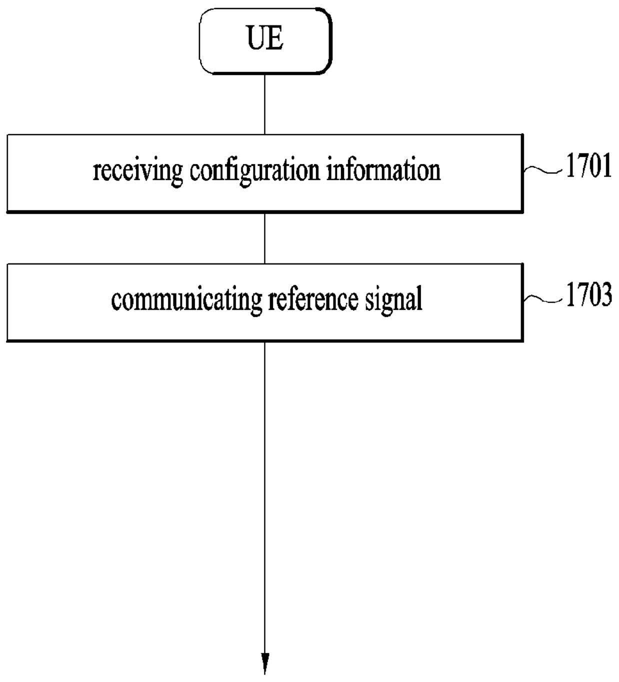
FIG. 17 is a flowchart illustrating an operating method of a UE according to the embodiment.

FIG. 17 is a flowchart illustrating an operating method of a UE according to the embodiment.

Figure 18:
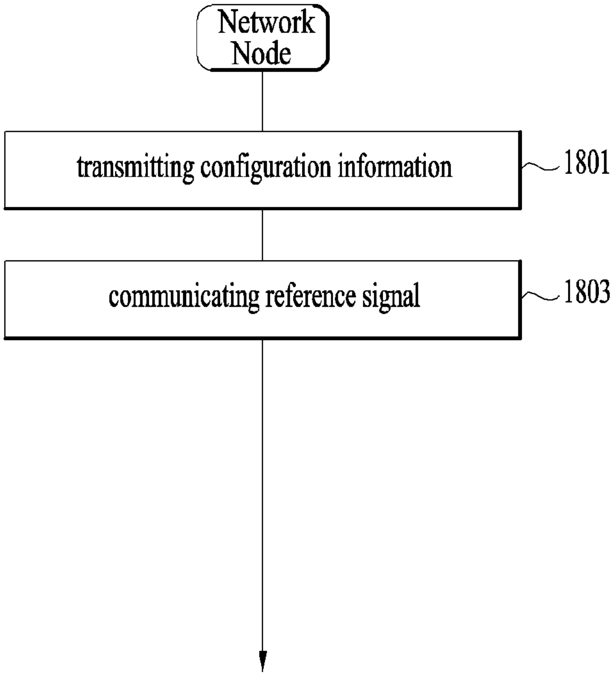
FIG. 18 is a flowchart illustrating an operating method of a network node according to the embodiment.

FIG. 18 is a flowchart illustrating an operating method of a network node according to the embodiment. For example, the network node may be a TP, a BS, a cell, a location server, an LMF, and/or any device that performs the same operation.

Referring to FIGS. 16 to 18, in operations 1601, 1701, and 1801 according to the embodiment, the network node may transmit configuration information related to an RS for positioning, and the UE may receive the RS for positioning. According to the embodiment, the reference signal for positioning may include a PRS, an SRS, an SSB, and a CSI-RS.

In operations 1603, 1703, and 1803 according to the embodiment, the network and UE may exchange an RS. For example, the network node may transmit a PRS/SSB/CSI-RS, and the UE may receive the PRS/SSB/CSI-RS. For example, the UE may transmit an SRS, and the network node may receive the SRS.

Specific operations of the UE and/or the network node according to the above-described the embodiment may be described and performed based on Section 1 to Section 3 described before.

Since examples of the above-described proposal method may also be included in one of implementation methods of the embodiment, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. EXEMPLARY CONFIGURATIONS OF DEVICES IMPLEMENTING THE EMBODIMENT

4.1. Exemplary Configurations of Devices to which the Embodiment is Applied

Figure 19:
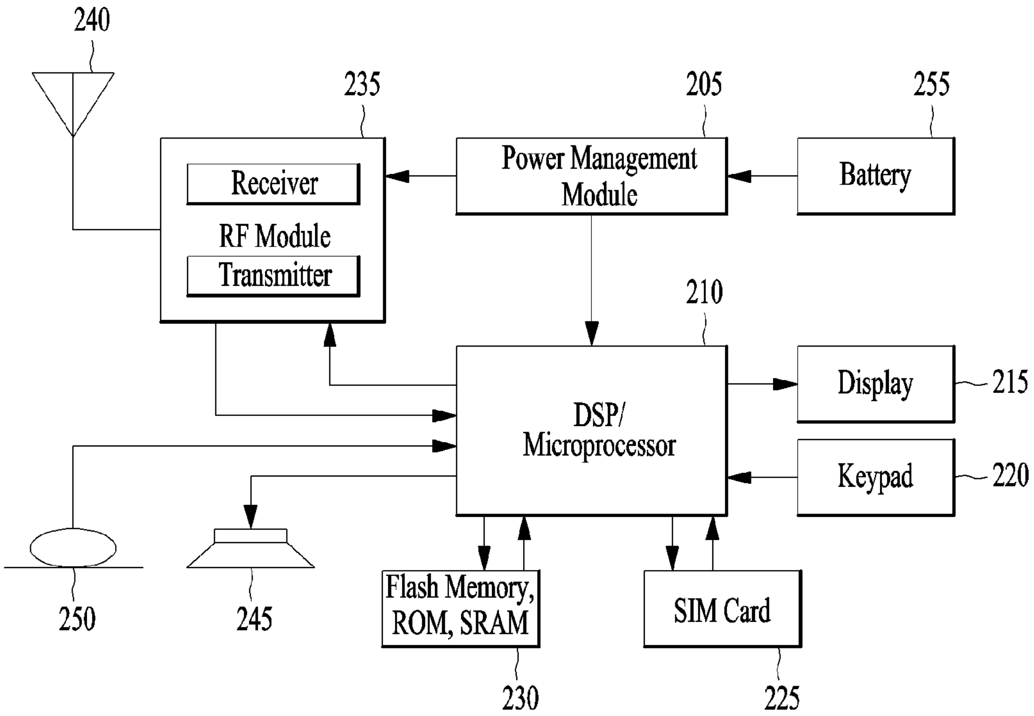
FIG. 19 is a block diagram illustrating an apparatus for implementing the embodiment.

FIG. 19 is a diagram illustrating a device that implements the embodiment.

The device illustrated in FIG. 19 may be a UE and/or a BS (e.g., eNB or gNB or TP) and/or a location server (or LMF) which is adapted to perform the above-described mechanism, or any device performing the same operation.

Referring to FIG. 19, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 19 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 19 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to the embodiment, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to the embodiment, the at least one processor included in the UE (or at least one processor of the communication device included in the UE) may be configured to: receive configuration information related to an RS for positioning; communicate the RS based on the configuration information; and perform an operation related to the positioning based on the RS.

According to the embodiment, in receiving the configuration information, an RRC state of the UE may be set to an RRC connected state.

According to the embodiment, based on that the RRC state of the UE is an RRC inactive state, the configuration information may be used.

According to the embodiment, based on that an estimated location of the UE in the RRC inactive state is obtained based on a pre-trained AI model, (i) information related to the estimated location may be reported by the UE; and (ii) the configuration information may be generated based on the information related to the estimated location.

According to the embodiment, the at least one processor included in the network node (or at least one processor of the communication device included in the network node) may be configured to: transmit. configuration information related to an RS for positioning; communicate the RS based on the configuration information; and perform an operation related to the positioning based on the RS.

According to the embodiment, in receiving the configuration information, an RRC state of the UE may be set to an RRC connected state.

According to the embodiment, based on that the RRC state of the UE is an RRC inactive state, the configuration information may be used.

According to the embodiment, based on that an estimated location of the UE in the RRC inactive state is obtained based on a pre-trained AI model, (i) information related to the estimated location may be reported by the UE; and (ii) the configuration information may be generated based on the information related to the estimated location.

Specific operations of the UE and/or the network node according to the above-described the embodiment may be described and performed based on Section 1 to Section 3 described before.

Unless contradicting each other, the embodiment may be implemented in combination. For example, (the processor included in) the UE and/or the network node according to the embodiment may perform operations in combination of the embodiments of the afore-described in Section 1 to Section 3, unless contradicting each other.

4.2. Example of Communication System to which the Embodiment is Applied

In the present specification, the embodiment have been mainly described in relation to data transmission and reception between a BS and a UE in a wireless communication system. However, the embodiment is not limited thereto. For example, the embodiment may also relate to the following technical configurations.

The various descriptions, functions, procedures, proposals, methods, and/or operational flowcharts of the embodiment described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
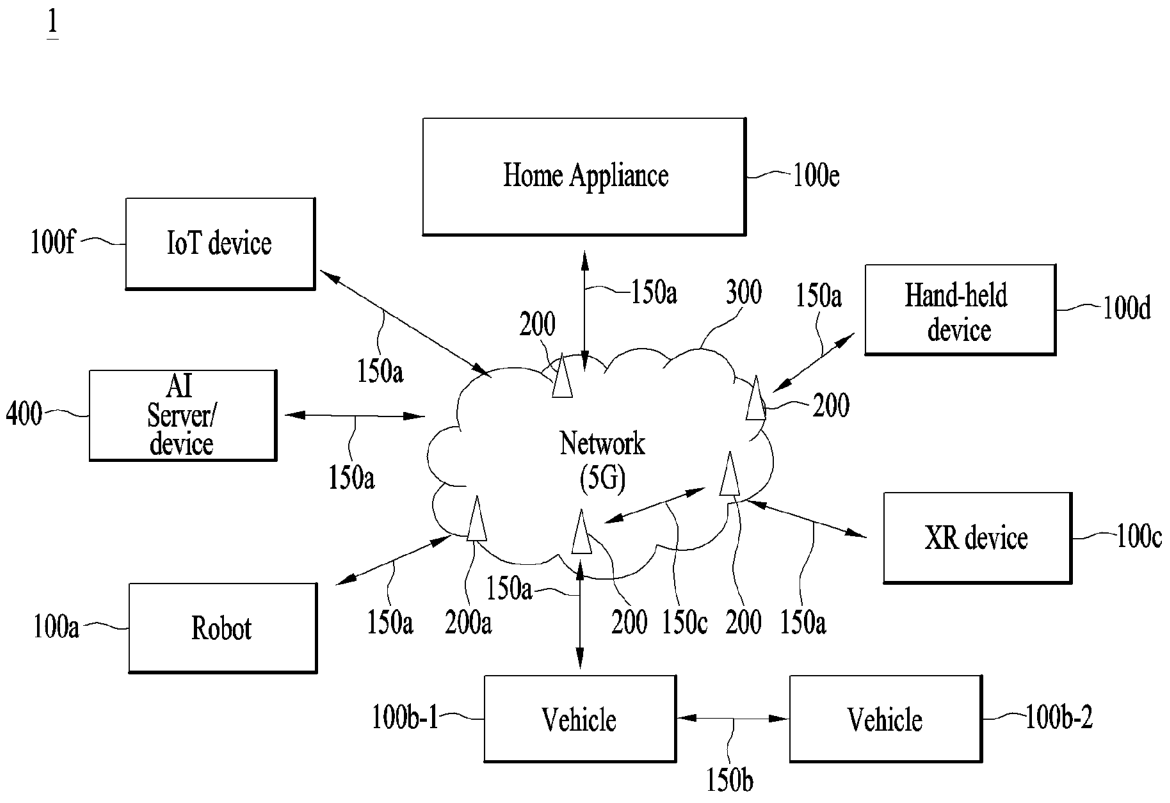
FIG. 20 is a diagram illustrating a communication system to which the embodiment is applicable.

FIG. 20 illustrates an exemplary communication system to which the embodiment is applied.

Referring to FIG. 20, a communication system 1 applied to the embodiment includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the embodiment.

Example of Wireless Devices to which the Embodiment is Applied

Figure 21:
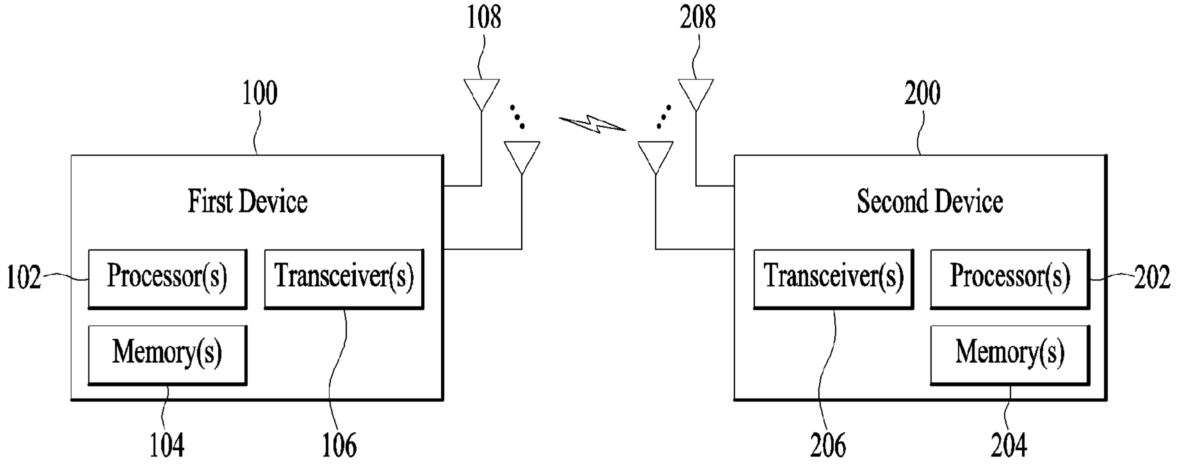
FIG. 21 is a block diagram illustrating wireless devices to which the embodiment is applicable.

FIG. 21 illustrates exemplary wireless devices to which the embodiment is applicable.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the embodiment, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the embodiment, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to the embodiment, one or more memories (e.g., 104 or 204) may store instructions or programs which, when executed, cause one or more processors operably coupled to the one or more memories to perform operations according to the embodiment or implementations of the present disclosure.

According to the embodiment, a computer-readable storage medium may store one or more instructions or computer programs which, when executed by one or more processors, cause the one or more processors to perform operations according to the embodiment or implementations of the present disclosure.

According to the embodiment, a processing device or apparatus may include one or more processors and one or more computer memories connected to the one or more processors. The one or more computer memories may store instructions or programs which, when executed, cause the one or more processors operably coupled to the one or more memories to perform operations according to the embodiment or implementations of the present disclosure.

Example of Using Wireless Devices to which the Embodiment is Applied

Figure 22:
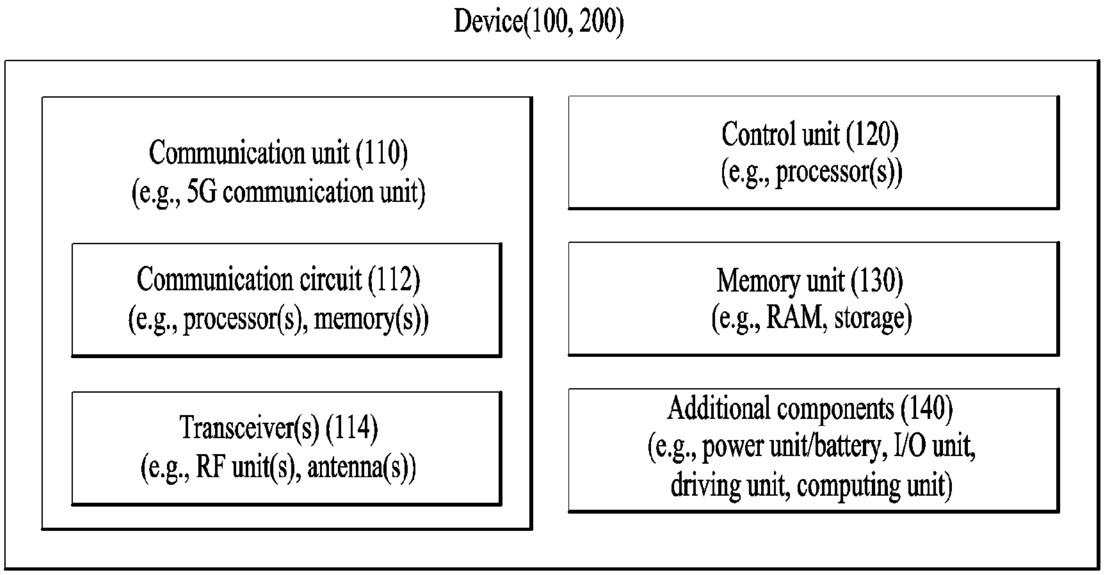
FIG. 22 is a block diagram illustrating another example of wireless devices to which the embodiment is applicable.

FIG. 22 illustrates other exemplary wireless devices to which the embodiment is applied. The wireless devices may be implemented in various forms according to a use case/service (see FIG. 20).

Referring to FIG. 22, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. W1), the vehicles (100*b*-1 and 100*b*-2 of FIG. W1), the XR device (100*c* of FIG. W1), the hand-held device (100*d* of FIG. W1), the home appliance (100*e* of FIG. W1), the IoT device (100*f* of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Example of Portable Device to which the Embodiment is Applied

Figure 23:
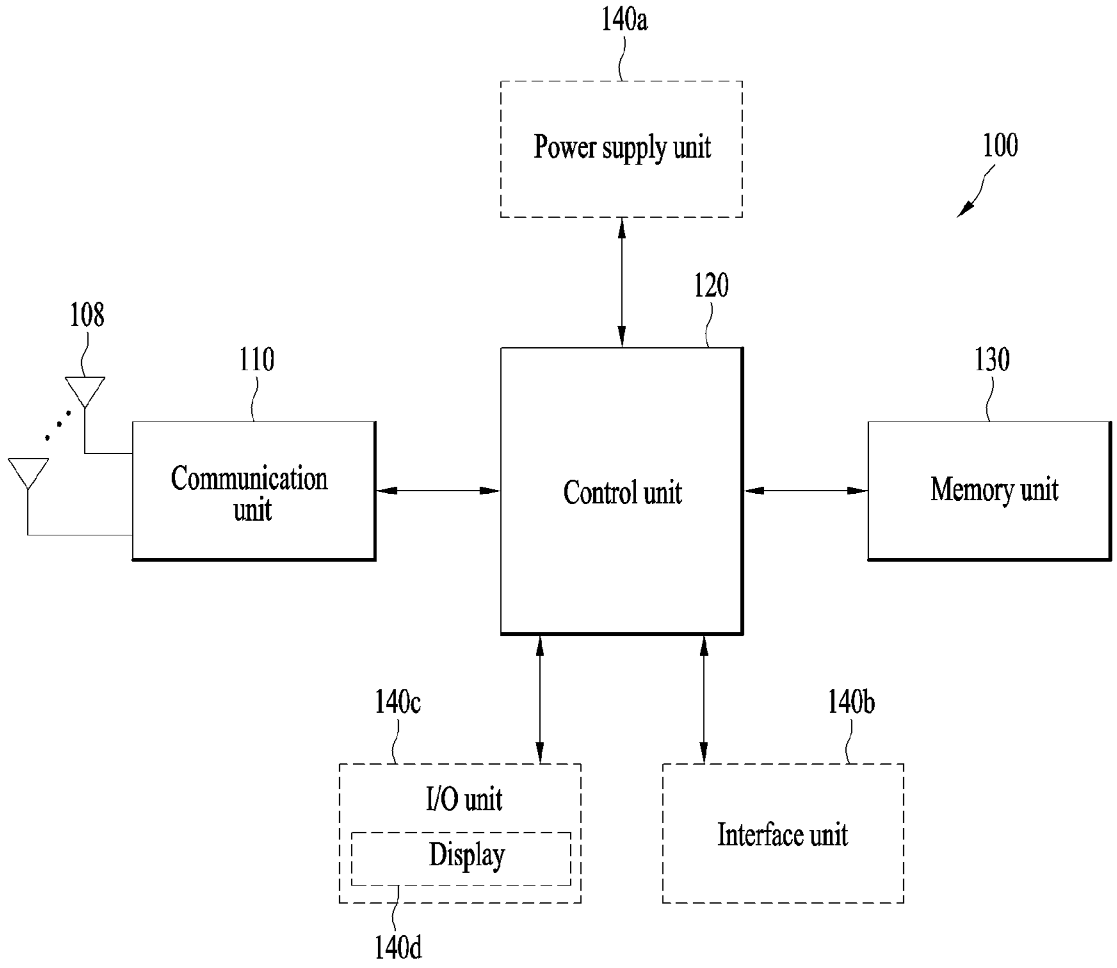
FIG. 23 is a block diagram illustrating a portable device applied to the embodiment.

FIG. 23 illustrates an exemplary portable device to which the embodiment is applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 23, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Example of Vehicle or Autonomous Driving Vehicle to which the Embodiment

Figure 24:
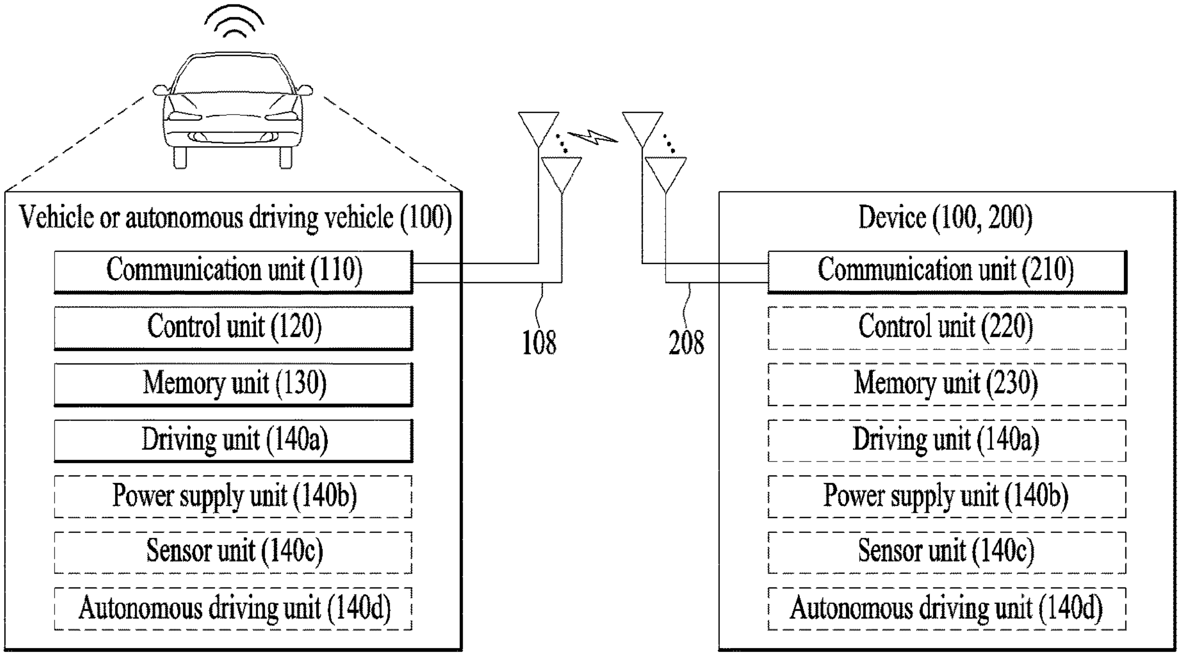
FIG. 24 is a block diagram illustrating a vehicle or an autonomous driving vehicle, which is applied to the embodiment.

FIG. 24 illustrates an exemplary vehicle or autonomous driving vehicle to which the embodiment. The vehicle or autonomous driving vehicle may be implemented as a mobile robot, a car, a train, a manned/unmanned aerial vehicle (AV), a ship, or the like.

Referring to FIG. 24, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, the embodiment may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multimode multi-band (MMMB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which the embodiment is implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to the embodiment may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to the embodiment may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

The embodiment may be implemented in various means. For example, the embodiment may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiment may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the embodiment may be carried out in other specific ways than those set forth herein without departing from the spirit and essential characteristics of the embodiment. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The embodiment is applicable to various wireless access systems including a 3GPP system, and/or a 3GPP2 system. Besides these wireless access systems, the embodiment is applicable to all technical fields in which the wireless access systems find their applications. Moreover, the proposed method can also be applied to mm Wave communication using an ultra-high frequency band.

The invention claimed is:

1. A method comprising:

receiving, by a user equipment (UE), configuration information related to a reference signal for positioning in a radio resource control (RRC) CONNECTED state;

receiving, by the UE, the reference signal based on the configuration information in a RRC INACTIVE state;

obtaining, by the UE, an estimated location of the UE based on the reference signal according to a pre-trained artificial intelligence (AI) model in the RRC INACTIVE state; and transmitting, by the UE, information related to the estimated location at a reporting instance in the RRC CONNECTED state for requesting update of the configuration information, wherein the information related to the estimated location includes information related to at least one transmission and reception point (TRP) for receiving the reference signal at a next report instance, which is predicted based on the estimated location.

2. The method of claim 1, wherein information related to a plurality of weights for a plurality of model inputs for inference of the pre-trained AI model is received in the RRC CONNECTED state.

3. The method of claim 2, wherein the plurality of model inputs include at least one of a time stamp, a velocity of the UE, an angular velocity of the UE, an acceleration of the UE, an angular acceleration of the UE, a beam direction of the UE, a time required for data transmission of the UE, or a time required for RRC state transition of the UE, and wherein the velocity of the UE, the angular velocity of the UE, the acceleration of the UE, and the angular acceleration of the UE are measured based on at least one sensor included in the UE.

4. The method of claim 1, wherein the information related to the estimated location includes the estimated location and an uncertainty range based on the estimated location.

5. The method of claim 1, wherein the configuration information includes resource allocation information on the reference signal in the RRC INACTIVE state, and wherein a validation check of the resource allocation information is performed based on the information related to the estimated location.

6. The method of claim 5, wherein the validation check is used as a criterion for determining model monitoring of the AI model.

7. The method of claim 5, wherein a window is configured based on a value for the estimated location, wherein the window is configured to start with a first value obtained by subtracting an offset value from the value for the estimated location and end with a second value obtained by adding the offset value to the value for the estimated location, wherein based on a value for a location of the UE obtained after the estimated location being included in the window, the resource allocation information is determined to be valid during the validation check, and wherein based on the value for the location of the UE obtained after the estimated location not being included in the window, the resource allocation information is determined to be invalid during the validation check.

8. A user equipment (UE) comprising:

at least one processor; and at least one computer memory storing instructions that, when executed by the at least one processor, cause the UE to perform operations comprising:

receiving configuration information related to a reference signal for positioning in a radio resource control (RRC) CONNECTED state;

receiving the reference signal based on the configuration information in a RRC INACTIVE state;

obtaining an estimated location of the UE based on the reference signal according to a pre-trained artificial intelligence, AI, model in the RRC INACTIVE state; and transmitting information related to the estimated location at a reporting instance in the RRC CONNECTED state for requesting update of the configuration information, wherein the information related to the estimated location includes information related to at least one transmission and reception point (TRP) for receiving the reference signal at a next report instance, which is predicted based on the estimated location.

9. The UE of claim 8, wherein information related to a plurality of weights for a plurality of model inputs for inference of the pre-trained AI model is received in the RRC CONNECTED state.

10. The UE of claim 8, wherein the at least one processor is configured to communicate with at least one of a mobile terminal, a network, or an autonomous vehicle other than a vehicle including the UE.

11. A method comprising:

transmitting, by a base station (BS), configuration information related to a reference signal for positioning in a radio resource control (RRC) CONNECTED state;

transmitting, by the BS, the reference signal based on the configuration information in a RRC INACTIVE state; and receiving, by the BS, information related to an estimated location of a UE at a reporting instance in the RRC CONNECTED state for requesting update of the configuration information, wherein the estimated location of the UE is obtained based on the reference signal according to a pre-trained artificial intelligence (AI) model in the RRC INACTIVE state, wherein the information related to the estimated location includes information related to at least one transmission and reception point (TRP) for receiving the reference signal at a next report instance, which is predicted based on the estimated location.

12. A base station (BS) comprising:

at least one processor; and at least one computer memory storing instructions that, when executed by the at least one processor, cause the BS to perform operations comprising:

transmitting configuration information related to a reference signal for positioning in a radio resource control (RRC) CONNECTED state;

transmitting the reference signal based on the configuration information in a RRC INACTIVE state; and receiving information related to an estimated location of a UE at a reporting instance in the RRC CONNECTED state for requesting update of the configuration information, wherein the estimated location of the UE is obtained based on the reference signal according to a pre-trained artificial intelligence (AI) model in the RRC INACTIVE state, wherein the information related to the estimated location includes information related to at least one transmission and reception point (TRP) for receiving the reference signal at a next report instance, which is predicted based on the estimated location.

13. An apparatus for a user equipment (UE), the apparatus comprising:

at least one processor; and at least one computer memory storing instructions that, when executed by the at least one processor, cause the UE to perform operations comprising:

receiving configuration information related to a reference signal for positioning in a radio resource control (RRC) CONNECTED state;

receiving the reference signal based on the configuration information in a RRC INACTIVE state; and obtaining an estimated location of the UE based on the reference signal according to a pre-trained artificial intelligence (AI) model in the RRC INACTIVE state; and transmitting information related to the estimated location at a reporting instance in the RRC CONNECTED state for requesting update of the configuration information, wherein the information related to the estimated location includes information related to at least one transmission and reception point (TRP) for receiving the reference signal at a next report instance, which is predicted based on the estimated location.

14. A non-transitory processor-readable medium comprising program instructions that, when executed by at least one processor, cause a user equipment (UE) to perform operations comprising:

receiving configuration information related to a reference signal for positioning in a radio resource control (RRC) CONNECTED state;

receiving the reference signal based on the configuration information in a RRC INACTIVE state;

obtaining an estimated location of the UE based on the reference signal according to a pre-trained artificial intelligence (AI) model in the RRC INACTIVE state; and transmitting information related to the estimated location at a reporting instance in the RRC CONNECTED state for requesting update of the configuration information, wherein the information related to the estimated location includes information related to at least one transmission and reception point (TRP) for receiving the reference signal at a next report instance, which is predicted based on the estimated location.

* * * * *